(12) United States Patent
Hurley et al.

(10) Patent No.: US 8,311,788 B2
(45) Date of Patent: Nov. 13, 2012

(54) METHOD TO QUANTIFY DISCRETE PORE SHAPES, VOLUMES, AND SURFACE AREAS USING CONFOCAL PROFILOMETRY

(75) Inventors: Neil Francis Hurley, Boston, MA (US); Tuanfeng Zhang, Lexington, MA (US); Guangping Xu, Fort Collins, CO (US); Lili Xu, Centennial, CO (US); Mirna Slim, Cambridge, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 598 days.

(21) Appl. No.: 12/459,454

(22) Filed: Jul. 1, 2009

(65) Prior Publication Data

US 2011/0004448 A1 Jan. 6, 2011

(51) Int. Cl.
*G06G 7/50* (2006.01)
(52) U.S. Cl. .............................. 703/9; 703/10
(58) Field of Classification Search ........... 703/9
See application file for complete search history.

(56) References Cited

U.S. PATENT DOCUMENTS

| | | | |
|---|---|---|---|
| 3,013,467 A | 12/1961 | Minsky | |
| 3,406,776 A | 10/1968 | Henry | |
| 3,469,311 A | 9/1969 | van Benthuysen et al. | |
| 4,079,421 A | 3/1978 | Kermisch | |
| 4,124,302 A | 11/1978 | Kuzmin | |
| 4,480,921 A | 11/1984 | Leveque et al. | |
| 4,483,619 A | 11/1984 | Leveque et al. | |
| 4,555,181 A | 11/1985 | Klumper et al. | |
| 4,567,759 A | 2/1986 | Ekstrom et al. | |
| 4,702,607 A | 10/1987 | Kinameri | |
| 4,734,578 A | 3/1988 | Horikawa | |
| 4,750,888 A | 6/1988 | Allard et al. | |
| 4,758,088 A | 7/1988 | Doyle | |
| 4,783,751 A | 11/1988 | Ehrlich et al. | |
| 4,821,164 A | 4/1989 | Swanson | |
| 4,863,252 A | 9/1989 | McCarthy et al. | |

(Continued)

FOREIGN PATENT DOCUMENTS

DE 102004043992 3/2006

(Continued)

OTHER PUBLICATIONS

Kim et al. "Three-Dimensional Tissue Cytometer Based on High-Speed Multiphoton Microscopy" Cytometry Part A_71A: 991_1002, 2007.*

(Continued)

*Primary Examiner* — Saif Alhija

(57) ABSTRACT

Methods for characterizing a sample of porous media using a measuring device along with a multipoint statistical (MPS) model. Retrieving a set of reflected measured data provided by the measuring device of a surface of the sample in order to produce a sample imaging log, wherein the retrieved set of measured data is communicated to a processor. Selecting depth-defined surface portions of the sample from the sample imaging log as a training image for inputting in the MPS model. Determining pattern based simulations from the training image using one of a pixel-based template which is applied to the training image. Constructing from the pattern based simulations a complete-sampling image log of surface portions of the sample. Repeat the above steps in order to construct three dimensional (3D) sample images from stacked successive pattern based simulations so as to construct at least one 3D model of the sample.

21 Claims, 22 Drawing Sheets

U.S. PATENT DOCUMENTS

| | | | |
|---|---|---|---|
| 4,868,883 A | 9/1989 | Chen |
| 4,877,960 A | 10/1989 | Messerschmidt et al. |
| 4,912,683 A | 3/1990 | Katahara et al. |
| 4,927,254 A | 5/1990 | Kino et al. |
| 4,972,258 A | 11/1990 | Wolf et al. |
| 4,997,242 A | 3/1991 | Amos |
| 5,022,743 A | 6/1991 | Kino et al. |
| 5,032,720 A | 7/1991 | White |
| 5,144,477 A | 9/1992 | White |
| 5,162,941 A | 11/1992 | Favro et al. |
| RE34,214 E | 4/1993 | Carlsson et al. |
| 5,200,705 A | 4/1993 | Clark et al. |
| 5,220,403 A | 6/1993 | Batchelder et al. |
| 5,239,178 A | 8/1993 | Derndinger et al. |
| 5,283,684 A | 2/1994 | Thomas et al. |
| 5,289,407 A | 2/1994 | Strickler et al. |
| 5,334,830 A | 8/1994 | Fukuyama et al. |
| 5,356,110 A | 10/1994 | Eddy |
| 5,384,806 A | 1/1995 | Agazzi |
| 5,463,897 A | 11/1995 | Prater et al. |
| 5,479,252 A | 12/1995 | Worster et al. |
| 5,537,247 A | 7/1996 | Xiao |
| 5,557,452 A | 9/1996 | Harris |
| 5,560,244 A | 10/1996 | Prater et al. |
| 5,587,832 A | 12/1996 | Krause |
| 5,659,420 A | 8/1997 | Wakai et al. |
| 5,675,443 A | 10/1997 | Dorsel |
| 5,713,364 A | 2/1998 | DeBaryshe et al. |
| 5,714,682 A | 2/1998 | Prater et al. |
| 5,777,342 A | 7/1998 | Baer |
| 5,809,163 A | 9/1998 | Delhomme et al. |
| 5,813,987 A | 9/1998 | Modell et al. |
| 5,814,820 A | 9/1998 | Dong et al. |
| 5,838,634 A | 11/1998 | Jones et al. |
| 5,866,911 A | 2/1999 | Baer |
| 5,887,009 A | 3/1999 | Mandella et al. |
| 5,923,465 A | 7/1999 | Byrd |
| 5,923,466 A | 7/1999 | Krause et al. |
| 5,939,709 A | 8/1999 | Ghislain et al. |
| 5,952,668 A | 9/1999 | Baer |
| 6,009,065 A | 12/1999 | Glushko et al. |
| 6,011,557 A | 1/2000 | Keskes et al. |
| 6,025,985 A | 2/2000 | Leytes et al. |
| 6,033,100 A | 3/2000 | Marquiss et al. |
| 6,071,748 A | 6/2000 | Modln et al. |
| 6,088,656 A | 7/2000 | Ramakrishnan et al. |
| 6,097,025 A | 8/2000 | Modlin et al. |
| 6,098,031 A | 8/2000 | Svetkoff et al. |
| 6,104,945 A | 8/2000 | Modell et al. |
| 6,125,079 A | 9/2000 | Birchak et al. |
| 6,133,986 A | 10/2000 | Johnson |
| 6,148,114 A | 11/2000 | Han |
| 6,159,425 A | 12/2000 | Edwards et al. |
| 6,177,998 B1 | 1/2001 | Svetkoff et al. |
| 6,181,425 B1 | 1/2001 | Svetkoff et al. |
| 6,185,030 B1 | 2/2001 | Overbeck |
| 6,187,267 B1 | 2/2001 | Taylor et al. |
| 6,201,639 B1 | 3/2001 | Overbeck |
| 6,248,988 B1 | 6/2001 | Krantz |
| 6,249,347 B1 | 6/2001 | Svetkoff et al. |
| 6,259,104 B1 | 7/2001 | Baer |
| 6,287,595 B1 | 9/2001 | Loewy et al. |
| 6,288,782 B1 | 9/2001 | Worster et al. |
| 6,297,018 B1 | 10/2001 | French et al. |
| 6,309,948 B1 | 10/2001 | Lin et al. |
| 6,313,960 B2 | 11/2001 | Marquiss et al. |
| 6,316,153 B1 | 11/2001 | Goodman et al. |
| 6,317,207 B2 | 11/2001 | French et al. |
| 6,326,605 B1 | 12/2001 | Modlin et al. |
| 6,335,824 B1 | 1/2002 | Overbeck |
| 6,366,357 B1 | 4/2002 | Svetkoff et al. |
| 6,385,484 B2 | 5/2002 | Nordstrom et al. |
| 6,411,838 B1 | 6/2002 | Nordstrom et al. |
| 6,452,686 B1 | 9/2002 | Svetkoff et al. |
| 6,466,316 B2 | 10/2002 | Modlin et al. |
| 6,469,311 B1 | 10/2002 | Modlin et al. |
| 6,483,582 B2 | 11/2002 | Modlin et al. |
| 6,488,892 B1 | 12/2002 | Burton et al. |
| 6,498,335 B2 | 12/2002 | Modlin et al. |
| 6,499,366 B1 | 12/2002 | Meadows et al. |
| 6,516,080 B1 | 2/2003 | Nur |
| 6,545,264 B1 | 4/2003 | Stern |
| 6,548,796 B1 | 4/2003 | Silvermintz et al. |
| 6,548,810 B2 | 4/2003 | Zaluzec |
| 6,576,476 B1 | 6/2003 | Taylor et al. |
| 6,657,216 B1 | 12/2003 | Poris |
| 6,661,515 B2 | 12/2003 | Worster et al. |
| 6,710,316 B2 | 3/2004 | Mandella et al. |
| 6,713,742 B2 | 3/2004 | Mandella et al. |
| 6,713,772 B2 | 3/2004 | Goodman et al. |
| 6,750,974 B2 | 6/2004 | Svetkoff et al. |
| 6,756,202 B2 | 6/2004 | Dorsel et al. |
| 6,760,613 B2 | 7/2004 | Nordstrom et al. |
| 6,768,918 B2 | 7/2004 | Zelenchuk |
| 6,791,690 B2 | 9/2004 | Corson et al. |
| 6,816,787 B2 | 11/2004 | Ramamoorthy et al. |
| 6,818,903 B2 | 11/2004 | Schomacker et al. |
| 6,821,787 B2 | 11/2004 | Neilson et al. |
| 6,825,921 B1 | 11/2004 | Modlin et al. |
| 6,826,422 B1 | 11/2004 | Modell et al. |
| 6,826,520 B1 | 11/2004 | Khan et al. |
| 6,835,574 B2 | 12/2004 | Neilson et al. |
| 6,839,661 B2 | 1/2005 | Costa et al. |
| 6,844,123 B1 | 1/2005 | Ekberg et al. |
| 6,845,325 B2 | 1/2005 | Valero et al. |
| 6,847,460 B2 | 1/2005 | Farrell et al. |
| 6,847,490 B1 | 1/2005 | Nordstrom et al. |
| 6,864,097 B1 | 3/2005 | Schembri et al. |
| 6,876,781 B2 | 4/2005 | Khoury |
| 6,883,158 B1 | 4/2005 | Sandstrom et al. |
| 6,897,405 B2 | 5/2005 | Cheng et al. |
| 6,902,935 B2 | 6/2005 | Kaufman et al. |
| 6,903,347 B2 | 6/2005 | Baer |
| 6,913,603 B2 | 7/2005 | Knopp et al. |
| 6,917,468 B2 | 7/2005 | Thomas |
| 6,933,154 B2 | 8/2005 | Schomacker et al. |
| 6,937,023 B2 | 8/2005 | McElhinney |
| 6,942,873 B2 | 9/2005 | Russell et al. |
| 6,943,968 B2 | 9/2005 | Nielson et al. |
| 6,952,668 B1 | 10/2005 | Kapilow |
| 6,982,431 B2 | 1/2006 | Modlin et al. |
| 6,987,570 B1 | 1/2006 | Schmit et al. |
| 6,991,765 B2 | 1/2006 | Neilson et al. |
| 6,992,761 B2 | 1/2006 | Modlin et al. |
| 7,005,306 B1 | 2/2006 | Poris |
| 7,018,842 B2 | 3/2006 | Dorsel et al. |
| 7,042,647 B2 | 5/2006 | Lo |
| 7,045,362 B2 | 5/2006 | Hartwich et al. |
| 7,068,583 B2 | 6/2006 | Khoury |
| 7,071,477 B2 | 7/2006 | Baer |
| 7,075,100 B2 | 7/2006 | Saccomanno et al. |
| 7,092,107 B2 | 8/2006 | Babayoff et al. |
| 7,103,401 B2 | 9/2006 | Schomacker et al. |
| 7,127,282 B2 | 10/2006 | Nordstrom et al. |
| 7,133,779 B2 | 11/2006 | Tilke et al. |
| 7,136,518 B2 | 11/2006 | Griffin et al. |
| 7,140,119 B2 | 11/2006 | Badami et al. |
| 7,154,605 B2 | 12/2006 | Worster et al. |
| 7,158,228 B2 | 1/2007 | Psaltis et al. |
| 7,187,810 B2 | 3/2007 | Clune et al. |
| 7,187,816 B2 | 3/2007 | Huang |
| 7,199,882 B2 | 4/2007 | Svetkoff et al. |
| 7,205,553 B2 | 4/2007 | Dorsel et al. |
| 7,224,162 B2 | 5/2007 | Proett et al. |
| 7,230,725 B2 | 6/2007 | Babayoff et al. |
| 7,251,398 B2 | 7/2007 | Baets et al. |
| 7,260,248 B2 | 8/2007 | Kaufman et al. |
| 7,262,889 B2 | 8/2007 | Sun et al. |
| 7,280,203 B2 | 10/2007 | Olschewski |
| 7,309,867 B2 | 12/2007 | Costa et al. |
| 7,310,547 B2 | 12/2007 | Zelenchuk |
| 7,312,919 B2 | 12/2007 | Overbeck |
| 7,324,710 B2 | 1/2008 | Andersson et al. |
| 7,330,273 B2 | 2/2008 | Podoleanu et al. |
| 7,345,975 B2 | 3/2008 | Fadeyev et al. |
| 7,363,158 B2 | 4/2008 | Stelting et al. |
| 7,365,858 B2 | 4/2008 | Fang-Yen et al. |

| | | | |
|---|---|---|---|
| 7,376,068 B1 | 5/2008 | Khoury | |
| 7,384,806 B2 | 6/2008 | Worster et al. | |
| 7,444,616 B2 | 10/2008 | Sandstrom et al. | |
| 7,474,407 B2 | 1/2009 | Gutin | |
| 7,483,152 B2 | 1/2009 | Jovancicevic et al. | |
| 7,516,055 B2 | 4/2009 | Strebelle | |
| 7,538,879 B2 | 5/2009 | Power | |
| 7,545,510 B2 | 6/2009 | Lee et al. | |
| 7,557,581 B2 | 7/2009 | Ostermeier et al. | |
| 7,630,517 B2 | 12/2009 | Mirowski et al. | |
| 7,718,351 B2 | 5/2010 | Ying et al. | |
| 7,765,091 B2 | 7/2010 | Lee et al. | |
| 7,783,462 B2 | 8/2010 | Landis et al. | |
| 7,933,757 B2 | 4/2011 | Awwiller | |
| 8,045,153 B2 | 10/2011 | Mimura et al. | |
| 2002/0031477 A1 | 3/2002 | Loewy et al. | |
| 2005/0002319 A1 | 1/2005 | Fadeyev et al. | |
| 2005/0010799 A1 | 1/2005 | Kelley et al. | |
| 2005/0057756 A1 | 3/2005 | Famg-Yen et al. | |
| 2005/0105097 A1 | 5/2005 | Fang-Yen et al. | |
| 2005/0128488 A1 | 6/2005 | Yelin et al. | |
| 2005/0192966 A1 | 9/2005 | Hilbert et al. | |
| 2005/0202660 A1 | 9/2005 | Cohen et al. | |
| 2005/0213430 A1 | 9/2005 | Jovancicevic et al. | |
| 2005/0231727 A1 | 10/2005 | Podoleanu et al. | |
| 2005/0235507 A1 | 10/2005 | Badami et al. | |
| 2006/0038571 A1 | 2/2006 | Ostermeier et al. | |
| 2006/0041410 A1 | 2/2006 | Strebelle | |
| 2006/0045421 A1 | 3/2006 | Baets et al. | |
| 2006/0102486 A1 | 5/2006 | Bentley et al. | |
| 2006/0126991 A1 | 6/2006 | Huang | |
| 2006/0132790 A1 | 6/2006 | Gutin | |
| 2006/0136419 A1 | 6/2006 | Brydon et al. | |
| 2006/0141617 A1 | 6/2006 | Desai et al. | |
| 2006/0193777 A1 | 8/2006 | Southall et al. | |
| 2006/0238842 A1 | 10/2006 | Sun et al. | |
| 2006/0256343 A1 | 11/2006 | Choma et al. | |
| 2007/0014435 A1 | 1/2007 | Mirowski et al. | |
| 2007/0165241 A1 | 7/2007 | Bertran et al. | |
| 2007/0203677 A1 | 8/2007 | Awwiller | |
| 2007/0213942 A1 | 9/2007 | Ponson et al. | |
| 2007/0216989 A1 | 9/2007 | Nerin et al. | |
| 2007/0239359 A1 | 10/2007 | Stelting et al. | |
| 2008/0057479 A1 | 3/2008 | Grenness | |
| 2008/0123106 A1 | 5/2008 | Zeng et al. | |
| 2008/0218850 A1 | 9/2008 | Power | |
| 2008/0266548 A1 | 10/2008 | Lee et al. | |
| 2009/0062496 A1 | 3/2009 | Shaffer et al. | |
| 2009/0104549 A1 | 4/2009 | Sandstrom et al. | |
| 2009/0114544 A1 | 5/2009 | Rousseau et al. | |
| 2009/0164182 A1 | 6/2009 | Pedersen et al. | |
| 2009/0259446 A1 | 10/2009 | Zhang et al. | |
| 2009/0262603 A1 | 10/2009 | Hurley et al. | |
| 2011/0004447 A1 | 1/2011 | Hurley | |
| 2011/0004448 A1 | 1/2011 | Hurley | |
| 2011/0181701 A1 | 7/2011 | Varslot et al. | |

FOREIGN PATENT DOCUMENTS

| | | |
|---|---|---|
| EP | 0114728 | 8/1984 |
| EP | 0147316 | 10/1991 |
| EP | 1630578 | 3/2006 |
| EP | 1739471 A1 | 1/2007 |
| EP | 1739471 B1 | 9/2007 |
| EP | 1098166 | 12/2008 |
| EP | 1805477 | 4/2009 |
| EP | 2056381 | 6/2012 |
| GB | 2439778 | 1/2008 |
| WO | 00041006 | 7/2000 |
| WO | 0107891 | 2/2001 |
| WO | 0173431 | 10/2001 |
| WO | 2004046337 | 6/2004 |
| WO | 2005001445 | 1/2005 |
| WO | 2005052220 | 6/2005 |
| WO | 2005054780 | 6/2005 |
| WO | 2005077255 | 8/2005 |
| WO | 2005085804 | 9/2005 |
| WO | 2005096061 | 10/2005 |
| WO | 2005103827 | 11/2005 |
| WO | 2005108911 | 11/2005 |
| WO | 2005108965 | 11/2005 |
| WO | 2006021205 | 3/2006 |
| WO | 2006042696 | 4/2006 |
| WO | 2006065772 | 6/2006 |
| WO | 2006069443 | 7/2006 |
| WO | 2006078839 | 7/2006 |
| WO | 2006105579 | 10/2006 |
| WO | 2006116231 | 11/2006 |
| WO | 2006120646 | 11/2006 |
| WO | 2007007052 | 1/2007 |
| WO | 2008000078 | 1/2008 |
| WO | 2008078096 | 7/2008 |
| WO | 2008078099 | 7/2008 |
| WO | 2008099174 | 8/2008 |
| WO | 2008125869 | 10/2008 |
| WO | 2008129233 | 10/2008 |
| WO | 2008147280 | 12/2008 |
| WO | 2009046181 | 4/2009 |

OTHER PUBLICATIONS

Holt, "Particle vs. laboratory modeling in in situ compaction" Physics and Chemistry of the Earth, Part A: Solid Earth and Geodesy, vol. 26, Issue 1-2, 2001, pp. 89-93.

Hoshen, et al, "Percolation and cluster distribution—I. Cluster multiple labeling technique and critical concentration algorithm" Physical Review B, vol. 14, No. 8, Oct. 15, 1976, pp. 3438-3445.

Huang, et al, "Super-resolution fluorescence microscopy" Annual Review of Biochemistry, vol. 78, 2009, pp. 993-1016.

Hurley, et al, "Quantification of vuggy porosity in a dolomite reservoir from borehole images and core, Dagger Draw Field, New Mexico" SPE 49323, presented at the SPE Annual Technical Conference and Exhibition, New Orleans, Louisiana, Sep. 27-30, 1998, 14 pages.

Hurley, "Flow unit determination in a vuggy dolomite reservoir, Dagger Draw Field, New Mexico" SPWLA Transactions, presented at the SPWLA 40th Annual Logging Symposium, Oslo, Norway, May 30-Jun. 3, 1999, 14 pages.

Hurley, "Borehole Images" in Asquith, G. and Krygowski, D.: Basic Well Log Analysis, 2nd Edition, AAPG Methods in Exploration Series No. 16, 2004, pp. 151-164.

Hurley, et al, "Method to generate fullbore images using borehole images and multi-point statistics" SPE 120671-PP, presented at the Middle East Oil & Gas Show and Conference, Bahrain, Mar. 15-18, 2009, 18 pages.

iReservoir, 2010, http://www.ireservoir.com/case_jonah.html, accessed Oct. 10, 2 pages.

Jackson, et al, "Upscaling permeability measurements within complex heterolithic tidal sandstones" Mathematical Geology, vol. 35, No. 5, Jul. 2003, pp. 499-520.

Jackson, et al, "Three-dimensional reservoir characterization and flow simulation of heterolithic tidal sandstones" AAPG Bulletin, vol. 89, No. 4, Apr. 2005, pp. 507-528.

Jennings, "Capillary pressure techniques: Application to exploration and development geology" AAPG Bulletin, vol. 71, No. 10, Oct. 1987, pp. 1196-1209.

Kayser, et al, "Visualizing internal rock structures" Offshore, vol. 64, No. 8, Aug. 2004, pp. 129-131.

Kayser, et al, "A closer look at pore geometry" Oilfield Review, vol. 18, No. 1, 2006, pp. 4-13.

Knackstedt, et al, "Digital core laboratory: Properties of reservoir core derived from 3d images" SPE 87009, Presented at the Asia-Pacific Conference on Integrated Modelling for Asset Management, Mar. 29-30, 2004, 14 pages.

Kuglin, et al, 1975, "The phase correlation image alignment method" Proceedings of the IEEE, International Conference on Cybernetics and Society, Palo Alto, CA, 1975, pp. 163-165.

Kuwahara, et al, 1976, "Digital processing of biomedical images" Plenum Press, 1976, pp. 187-203.

Kyprianidis, et al, "Image and video abstraction by anisotropic kuwahara filtering" Pacific Graphics, vol. 28, No. 7, 2009, pp. 1955-1963.

Lasseter, et al, "Reservoir heterogeneities and their influence on ultimate recovery" in Lake, L. W., and Carroll, H. B., Jr., eds., Reservoir Characterization: Academic Press, Orlando, Florida, 1986, pp. 545-559.

Leduc, et al, "FMI* based sedimentary facies modelling, Surmont Lease (Athabasca, Canada)" (abs.): CSPG Annual Convention, Calgary, Alberta, Canada, Jun. 3-7, 2002, 10 pages.

Levy, et al, "Geomorphology of carbonate systems and reservoir modeling: Carbonate training images, FDM cubes, and MPS simulations" (abs.):AAPGAnnual Convention, Long Beach, California, Apr. 1-4, 2007a, http://searchanddiscovery.com/ documents /2008/ 08054levy/index.htm (accessed Jul. 15, 2008) 6 pages.

Levy, et al, "Importance of facies-based earth models for understanding flow behavior in carbonate reservoirs" (abs.): AAPG Annual Convention, Long Beach, California, Apr. 1-4, 2007b, http:// searchanddiscovery.com/documents/2008 /08097harris25a/index. htm (accessed Sep. 5, 2008) 25 pages.

Li et al, "Investigation of the asphaltene precipitation process from Cold Lake bitumen by confocal scanning laser microscopy" SPE 30321, Presented at the International Heavy Oil Symposium, Calgary, Alberta, Canada, Jun. 19-21, 1995, pp. 709-716.

Li, "Characterization of rock heterogeneity using fractal geometry" SPE 86975, Presented at SPE International Thermal Operations and Heavy Oil Symposium and Western Regional Meeting, Mar. 16-18, 2004, Bakersfield, California, 7 pages.

Mandelbrot, "How long is the coast of Britain? Statistical self-similarity and fractional dimension" Science, vol. 156, 1967, pp. 636-638.

Marrett et al, "Extent of power law scaling for natural fractures in rocks" Geology, vol. 27, No. 9, Sep. 1999, pp. 799-802.

Marzouk et al "Geologic controls on wettability of carbonate reservoirs, Abu Dhabi, U.A.E." SPE 29883, presented at the SPE Middle East Oil Show, Kingdom of Bahrain, Mar. 11-14, 1995, pp. 449-450.

Mathis, et al, "From the geologists' eyes to synthetic core descriptions: Geological log modeling using well-log data (abs.)" AAPG Annual Meeting, Salt Lake City, UT, May 2003, 7 pages.

Mell, B. Analytical report Nanovea—061213-21: Microphotonics internal report, Dec. 13, 2006, 10 pages.

Menendez, et al, "Confocal scanning laser microscopy applied to the study of pore and crack networks in rocks" Computers & Geoscience, vol. 27, No. 9, 2001, pp. 1101-1109.

Microphotonics, 2009, http://www.nanovea.com/Profilometers, html, accessed Mar. 30, 2 pages.

Neal, et al, "Sequence stratigraphy—A global theory for local success" Oilfield Review, January issue, 1993, pp. 51-62.

Nikon, 2009, http://www.microscopyu.com/articles/confocal/index. html, access on Mar. 30, 2 pages.

Nix, et al, "New methods applied to the microstructure analysis of Messel Oil Shale: Confocal laser scanning microscopy (CLSM) and environmental scanning electron microscopy (ESEM)" Geology Magazine, vol. 140, No. 4, 2003, pp. 469-478.

Norris, et al, "The geological modeling of effective permeability in complex heterolithic facies" SPE 22692, Presented at the 66th Annual Technical Conference and Exhibition, Dallas, TX, Oct. 6-9, 1991, pp. 359-374.

O'Connor, et al, "Microscale flow modeling in geologic materials" Physics and Chemistry of the Earth, Part A: Solid Earth and Geodesy, vol. 24, Issue 7, 1999, 9 pages.

Okabe, et al, "Prediction of permeability for porous media reconstructed using multiple-point statistics" Physical Review E, vol. 70, 2004, pp. 066135-1-10.

Okabe, et al, "Pore space reconstruction using multiple-point statistics" Journal of Petroleum Science and Engineering, vol. 46, 2005, pp. 121-137.

Okabe, et al, "Pore space reconstruction of vuggy carbonates using microtomography and multiple-point statistics" Water Resources Research, vol. 43, 2007, W12S02, 5 pages.

Okabe, et al, "Pore-scale heterogeneity assessed by the lattice-Boltzmann method" International Symposium of the Soc. of Core Analysts, Trondheim, Norway, Sep. 12-16, 2006 Paper SCA2006-44, 7 pages.

Olympus, 2009, http://www.olympusconfocal.com/theory/ confocalintro.htm., accessed on Mar. 30.

Olympus, 2009, http://www.olympus-global.com/en/news/204a/ nr040326ols3e.cfm , accessed on Mar. 30.

Oren et al, "Extending predictive capabilities to network models", SPE Journal, Dec. 1998, first presented at the 1997 SPE Annual Technical Conference and Exhibition held in San Antonio, Texas Oct. 5-8.

Oren, et al, "Process based reconstruction of sandstones and prediction of transport properties" Transport in Porous Media, vol. 46, 2002, pp. 311-343.

Papari, et al, "Artistic edge and corner enhancing smoothing" IEEE Transactions on Image Processing, vol. 16, No. 10, Oct. 2007, pp. 2449-2462.

Petford, et al, 2001, "Investigation of the petrophysical properties of a porous sandstone using confocal scanning laser microscopy" Petroleum Geoscience, vol. 7, No. 2, 2001, pp. 99-105.

Petromod, 2010, http://www.ies.de/, accessed Oct. 10, 2 pages.

Pittman, et al, "Use of pore casts and scanning electron microscope to study pore geometry" Journal of Sedementary Petrology, vol. 40, No. 4, Dec. 1970, pp. 1153-1157.

Pittman, "Microporosity in carbonate rocks" AAPG Bulletin, vol. 55, No. 10, Oct. 1971, pp. 1873-1881.

Pittman, "Relationship of porosity and permeability to various parameters derived from mercury injection-capillary pressure curves for sandstone" AAPG Bulletin, vol. 76, No. 2, Feb. 1992, pp. 191-198.

Zhang, et al, "Models and methods for determining transport properties of touching-vug carbonates" SPE 96027, presented at the SPE Annual Technical Conference and Exhibition, Dallas, TX, Oct. 9-12, 2005, 9 pages.

Zhang, et al, "3D porosity modeling of a carbonate reservoir using continuous multiple-point statistics simulation" SPE Journal vol. 11, Sep. 2006, pp. 375-379.

Zhang, T. 2006a, "Filter-based training image pattern classification for spatial pattern simulation" PhD dissertation, Stanford University, Palo Alto, CA, Mar. 2006, 153 pages.

Zhang, et al, 2006, "Filter-based classification of training image patterns for spatial pattern simulation" Mathematical Geology, vol. 38, No. 1, pp. 63-80.

Zhang, T. "Incorporating geological conceptual models and interpretations into reservoir modeling using multi-point geostatistics" Earth Science Frontiers, vol. 15, No. 1, Jan. 2008, pp. 26-35.

Zhang, et al, "Numerical modeling of heterogeneous carbonates and multi-scale dynamics" Presented at the SPWLA 50th Annual Logging Symposium, The Woodlands, Texas, Jun. 21-24, 2009, 12 pages.

Zhang, "Porous media reconstruction using a cross-section image and multiple-point geostatistics", ICACC International Conference pp. 24-29, 2009, Article No. 4777303.

Zuiderveld, K, "Contrast limited adaptive histograph equalization" in Heckbert, P. S., Graphic Gems IV, San Diego: Academic Press Professional, 1994, pp. 474-485.

Pizer, et al, "Adaptive histogram equalization and its variations" Computer Vision, Graphics and Image Processing, vol. 39, No. 3, 1987, pp. 355-368.

Preibisch, et al, "Globally optimal stitching of tiled 3D microscopic image acquisitions" Bioinformatics Advance Access, vol. 25, No. 11, Apr. 2009, 3 pages.

Prodanovic, et al, "Porous structure and fluid partiioning in polyethylene cores from 3D X-ray microtomographic imaging" Journal of Colloid and Interface Science, vol. 298, 2006, pp. 282-297.

Pyrcz, et al, "The whole story on the hole effect", in Searston, S. (ed.) Geostatistical Association of Australasia, Newsletter May 18, 2003, 16 pages.

Qi, D., Upscaling theory and application techniques for reservoir simulation: Lambert Academic Publishing, Saarbrucken, Germany, 2009, 7 pages.

Ramakrishnan, et al, "A petrophysical and petrographic study of carbonate cores from the Thamama formation" SPE 49502, presented at the 8th Abu Dhabi International Petroleum Exhibition and Conference, Abu Dhabi, U.A.E., Oct. 11-14, 1998, 14 pages.

Ramamoorthy, et al, "A new workflow for petrophysical and textural evaluation of carbonate reservoirs" Paper B presented at the SPWLA 49th Annual Logging Symposium, Edinburgh, Scotland, May 25-28, 2008, 15 pages.

Reid, et al, "Monterey Formation porcelanite reservoirs of the Elk Hills field, Kern County, California" AAPG Bulletin, vol. 85, No. 1, Jan. 2001, pp. 169-189.

Ribes, et al, "Applications of confocal macroscope-microscope luminescence imaging to sediment cores" New Techniques in Sediment Core Analysis: Geological Society of London, Special Publication vol. 267, 2006, pp. 141-150.

Roerdink, et al, "The watershed transform: Definitions, algorithms and parallelization strategies" Fundamenta Informaticae, vol. 41, 2001, pp. 187-228.

Russell, et al, "Rock types and permeability prediction from dipmeter and image logs: Shuaiba reservoir (Aptian), Abu Dhabi" AAPG Bulletin, vol. 86, No. 10, Oct. 2002, pp. 1709-1732.

Sahoo, et al, "A survey of thresholding techniques" Computer Vision, Graphics, and Image Processing, vol. 41, No. 2, 1988, pp. 233-260.

Saltykov, "The determination of the size distribution of particles in an opaque material from a measurement of size distribution of their sections" in Elias, H (ed) Stereology: Proc. Second Int. Cong. For Stereology, New York: Springer-Verlag, 1967, pp. 163-173.

Schlumberger, "Stratigraphic high resolution dipmeter tool" Schlumberger Ltd., Paris, Document No. M-08630, 1983, 26 pages.

Sedsim, 2010, https://wiki.csiro.au/confluence/display/seabedchange/Home, accessed Oct. 10, 2 pages.

Sezgin, et al, "Survey over image thresholding techniques and quantitative performance evaluation" Journal of Electronic Imaging, vol. 13, No. 1, Jan. 2004, pp. 146-165.

Siddiqui, et al, "Data visualization challenges for displaying laboratory core and flow data in three-dimensions" SPE 106334, presented at the SPE Technical Symposium of Saudi Arabia, May 14-16, 2005, 9 pages.

Siddiqui, et al, "Techniques for extracting reliable density and porosity data from cuttings" SPE 96918, presented at the SPE Annual Technical Conference and Exhibition, Dallas, TX, Oct. 9-12, 2005, 13 pages.

Solymar, et al, "Image analysis and estimation of porosity and permeability of Arnager Greensand, Upper Cretaceous, Denmark" Physics and Chemistry of the Earth, Part A: Solid Earth and Geodesy, vol. 24, No. 7, 1999, pp. 587-591.

Strebelle, "Conditional simulation of complex geological structures using multiple point statistics" Mathematical Geology, vol. 34, No. 1, Jan. 2002, pp. 1-21.

Strebelle, et al, "Modeling of a deepwater turbidite reservoir conditional to seismic data using principal component analysis and multiple-point geostatistics" SPE Journal, Sep. 2003, pp. 227-235.

Strebelle, et al, "Non-stationary multiple-point geostatistical models", in Leuangthong, O. and Deutsch, C. V., eds.: Geostatistics, vol. 1, 2004, pp. 235-244.

Suicmez, et al, "Pore network modeling: A new technology for SCAL predictions and interpretations" Saudi Arabia Oil and Gas, Issue 5, 2008, pp. 64-70.

Taud, et al, "Porosity estimation method by x-ray computed tomography" Journal of Petroleum Science and Engineering, vol. 47, No. 3-4, 2005, pp. 209-217.

Thomeer, "Introduction of a pore geometrical factor defined by the capillary pressure curve" Journal of Petroleum Technology, vol. 12, No. 3, Mar. 1960, pp. 73-77.

Thompson, "Fractals in rock physics" Annual Review of Earth and Planetary Sciences, vol. 19, 1991, pp. 237-262.

Tilke, et al, "Quantitative analysis of porosity heterogeneity: Application of geostatistics to borehole images" Mathematical Geology, vol. 38, No. 2, Feb. 2006, pp. 155-174.

Tomutsa, et al, "Focused ion beam assisted three-dimensional rock imaging at submicron scale" International Symposium of the Soc. of Core Analysts, Pau, France, Sep. 21-24, 2003, Paper SCA2003-47, 6 pages.

Tomutsa, et al, "Analysis of chalk petrophysical properties by means of submicron-scale pore imaging and modeling" SPE Reservoir Evaluation and Engineering, vol. 10, Jun. 2007, pp. 285-293.

Vahrenkamp, et al, Multi-scale heterogeneity modelling in a giant carbonate field, northern Oman (abs.): GeoArabia, vol. 13, No. 1, p. 248.

Vincent, "Watersheds in digital spaces: An efficient algorithm based on immersion simulations" IEEE Transactions on Pattern Analysis and Machine Intelligence, vol. 13, No. 6, Jun. 1991, pp. 583-598.

Vinegar, "X-ray CT and NMR imaging of rocks" JPT, Mar. 1986, pp. 257-259.

Wardlaw, "Pore geometry of carbonate rocks as revealed by pore casts and capillary pressure" AAPG Bulletin, vol. 60, No. 2, Feb. 1976, pp. 245-257.

Wardlaw, "The effect of pore structure on displacement efficiency in reservoir rocks and in glass micromodels", SPE 8843, presented at the First Joint SPE/DOE Symposium on Enhanced Oil Recovery at Tulsa, Oklahoma, Apr. 20-23, 1980.

Washburn, "The dynamics of capillary flow" Physical Review, vol. 17, No. 3, Mar. 1921, pp. 273-283.

Wellington, et al, "X-ray computerized tomography" JPT, Aug. 1987, pp. 885-898.

Wikipedia, 2010a, website http://en.wikipedia.org/wiki/Confocal_microscopy, accessed on Oct. 31.

Wikipedia, 2010b, website http://en.wikipedia.org/wiki/Two-photon_excitation_microscopy, accessed on Oct. 23.

Williams, et al, "Assessment and interpretation of electrical borehole images using numerical simulations" The Log Analyst, vol. 38, No. 6, Nov.-Dec. 1997, pp. 34-44.

Withjack, et al, "The role of X-ray computed tomography in core analysis" SPE 83467, presented at the Western Region/AAPG Pacific Section Joint Meeting, Long Beach, CA, May 19-24, 2003, 12 pages.

Wu, et al, "3D stochastic modeling of heterogeneous porous media—Applications to reservoir rocks" Transport in Porous Media, vol. 65, 2006, pp. 443-467.

Wu, et al, "Validation of methods for multi-scale pore space reconstruction and their use in prediction of flow properties of carbonate" Paper SCA2008-34, International Symposium of the Society of Core Analysts, Abu Dhabi, Oct. 29-Nov. 2, 2008,12 pages.

Xiao, et al, "Fully integrated solution for LWD resistivity image application a case study from Beibu Gulf, China" 1st SPWLA India Regional Conference, Formation Evaluation in Horizontal Wells, Mumbai, Mar. 19-20, 2007, 10 pages.

Ye, et al, "Automatic high resolution texture analysis on borehole imagery" Transactions of the SPWLA Annual Logging Symposium, May 1998, pp. M1-M14.

Yuan, et al, "Resolving pore-space characteristics by rate-controlled porosimetry" SPE Formation Evaluation, vol. 4, No. 1, Mar. 1989, pp. 17-24.

Zemanek, et al, "Formation evaluation by inspection with the borehole televiewer" Geophysics, vol. 35, No. 2, Apr. 1970, pp. 254-269.

Zhang, et al, "Pore scale study of flow in porous media: Scale dependency, REV, and statistical REV" Geophysical Research Letters, vol. 27, No. 8, Apr. 2000, pp. 1195-1198.

Adams, et al, "Strategies for dipmeter interpretation" Part 2: The Technical Review, vol. 35, No. 4, 1987, pp. 20-31.

Angulo, et al, "Fractal dimensions from mercury intrusion capillary tests" SPE 23695, Presented at the Second Latin American Petroleum Engineering Conference, Caracas, Venezuela, Mar. 8-11, 1992, pp. 255-263.

Anselmetti, et al, "Quantitative characterization of carbonate pore systems by digital image analysis" AAPG Bulletin, vol. 82, No. 10, Oct. 1998, pp. 1815-1836.

Bakke, et al, "3-D pore-scale modeling of sandstones and flow simulations in the pore networks" SPE 35479, vol. 2, European 3-D Reservoir Modeling Conference, held in Stavanger, Norway, Apr. 16-17, 1996, Jun. 1997, pp. 136-149.

Bakke, et al, "Pore scale modeling of carbonate reservoir rocks" Downloaded from website http://www.numericalrocks.com, Mar. 30, 2008, 13 pages.

Bear, J., "Dynamics of fluids in porous media" Elsevier, New York, pp. 13-26 and 38-57, 1972.

Behseresht, et al, "Infinite-acting physically representative networks for capillarity-controlled displacements" SPE 110581, presented at the SPE Annual Technical Conference and Exhibition, Anaheim, CA, Nov. 11-14, 2007, 15 pages.

Bereskin, et al, "Carbonate microporosity: Recognizing its existence and understanding its role in hydrocarbon production", in Dolly, E.

D., and Mullarkey, J. C., eds., Hydrocarbon Production from Low Contrast, Low Resistivity Reservoirs, Rocky Mountain and Midcontinent Regions: Log Examples of Subtle Pays: Rocky Mountain Association of Geologists Guidebook, Denver, Colorado, 1996, pp. 33-42.

Bigelow, "Making more intelligent use of log derived dip information. Part 1, Suggested guidelines" The Log Analyst, vol. 26, No. 1, pp. 41-53, 1985.

Bigelow "Making more intelligent use of log derived dip information. Part 2, Wellsite data gathering considerations" The Log Analyst, vol. 26, No. 2, pp. 25-41, 1985.

Bigelow, "Making more intelligent use of log derived dip information. Part 3, Computer processing considerations" The Log Analyst, vol. 26, No. 3, pp. 18-31, 1985.

Bigelow, "Making more intelligent use of log derived dip information. Part 4, Structural interpretation" The Log Analyst, vol. 26, No. 4, pp. 21-43, 1985.

Bigelow, "Making more intelligent use of log derived dip information. Part 5, Stratigraphic interpretation" The Log Analyst, vol. 26, No. 5, pp. 25-64, 1985.

Bosl, et al, "A study of porosity and permeability using a lattice Boltzmann simulation" Geophysical Research Letters, vol. 25, No. 9, May 1998, pp. 1475-1478.

Bourke, "Core permeability imaging: It's relevance to conventional core characterization and potential application to wireline measurement" Marine and Petroleum Geology, vol. 10, Aug. 1993, pp. 318-324.

Bryant, et al, "Physically representative network models of transport in porous media" American Institute of Chemical Engineers Journal, vol. 39, No. 3, Mar. 1993, pp. 387-396.

Caers, et al, "Multiple-point geostatistics: A quantitative vehicle for integration of geologic analogs into multiple reservoir models", in M. Grammer, P. M. Harris and G. P. Eberli, eds.: Integration of Outcrop and Modern Analogs in Reservoir Modeling, AAPG. Memoir 80, 2004, pp. 383-394.

Cantrell, et al, "Microporosity in Arab Formation carbonates, Saudi Arabia" GeoArabia, vol. 4, No. 2, 1999, pp. 129-154.

Chen, et al, "What is the shape of pores in natural rocks?" Journal of Chemical Physics, vol. 116, May 2002, pp. 8247-8250.

Choquette, et al, "Geologic nomenclature and classification of porosity in sedimentary carbonates" AAPG Bulletin, vol. 54, No. 2, Feb. 1970, pp. 207 250.

Christie, M. A, Upscaling for reservoir simulation: JPT, SPE 37324, vol. 48, No. 11, Nov. 1996, pp. 1004-1010.

Clauset, et al, "Power-law distributions in empirical data" SIAM Review, vol. 51, No. 4, Feb. 2009, pp. 1-43.

Clerke, "Permeability, relative permeability, microscopic displacement efficiency, and pore geometry of M_1 bimodal pore systems in Arab D limestone" SPE Journal, vol. 14, No. 3, 2009, 8 pages.

Clerke, et al, "Application of Thomeer hyperbolas to decode the pore systems, facies and reservoir properties of the upper Jurassic Arab D limestone, Ghawar field, Saudi Arabia: A "Rosetta Stone" approach" GeoArabia, vol. 13, No. 4, 2008, pp. 113-116.

Coles, et al, "Developments in synchrotron X-ray microtomography with applications to flow in porous media" SPE 36531, presented at the SPE Annual Technical Conference and Exhibition, Denver, CO, Oct. 6-9, 1996, pp. 413-424.

Creusen, et al, "Property modeling small scale heterogeneity of carbonate facies" SPE 111451, Presented at Reservoir Characterization and Simulation Conference, Abu Dhabi, U.A.E., Oct. 28-31, 2007, 5 pages.

Davis, et al, "Image analysis of reservoir pore systems: State of the art in solving problems related to reservoir quality" SPE 19407, presented at the SPE Formation Damage Control Symposium, Lafayette, Louisiana, Feb. 22-23, 1990, pp. 73-82.

Dehghani, et al, "Modeling a vuggy carbonate reservoir, McElroy Field, West Texas" AAPG Bulletin, vol. 83, No. 1, Jan. 1999, pp. 19-42.

Delhomme, "A quantitative characterization of formation heterogeneities based on borehole image analysis" Trans. 33rd Symposium SPWLA, Paper T, Jun. 1992, 25 pages.

Duey, R, "Quick analysis answers Heidrun question" Hart Energy Publishing, LP, accessed online at http://www.eandp.info/index2.php?area=article&articleld=767, Mar. 27, 2008, 4 pages.

Durlofsky, "Upscaling of geocellular models for reservoir flow simulation: A review of recent progress" presented at the 7th International Forum on Reservoir Simulation, Buhl/Baden-Baden, Germany, Jun. 23-27, 2003, 58 pages.

Dvorkin, et al, "Real time monitoring of permeability, elastic moduli and strength in sands and shales using Digital Rock Physics" SPE 82246, presented at the SPE European Formation Damage Conference, The Hague, Netherlands, May 13-14, 2003, 7 pages.

Ehrlich, et al, "Petrographic image analysis, I. Analysis of reservoir pore complexes" Journal of Sedimentary Petrology, vol. 54, No. 4, Dec. 1984, pp. 1365-1378.

Fabbri, "GIAPP: Geological image-analysis program package for estimating geometrical probabilities" Computers & Geosciences, vol. 6, No. 2. 1980, pp. 153-161.

Fredrich, et al, "Imaging the pore structure of geomaterials" Science, vol. 268, Apr. 1995, pp. 276-279.

Fredrich, "3D imaging of porous media using laser scanning confocal microscopy with application to microscale transport processes" Physics and Chemistry of the Earth, Part A: Solid Earth and Geodesy, vol. 24, No. 7, 1999, pp. 551-561.

Fredrich, et al, "Predicting macroscopic transport properties using microscopic image data" Journal of Geophysical Research, vol. 111, 2006, 14 pages.

Fredrich, et al, "Predicting petrophysical properties using 3D image data (abs.)" AAPG Annual Convention, downloaded at http://www.aapg.org , 2007.

Geocosm, http://www.geocosm.net/, accessed Oct. 10, 2010, 5 pages.

Gies, et al, "Petrographic image analysis: An effective technology for delineating reservoir quality" SPE 26147, presented at the SPE Gas Technology Symposium, Calgary, Alberta, Canada, Jun. 28-30, 1993, pp. 99-106.

Gilreath, Strategies for dipmeter interpretation: Part I: The Technical Review, vol. 35, No. 3, 1987, pp. 28-41.

Gomaa, et al, "Case study of permeability, vug quantification, and rock typing in a complex carbonate" SPE 102888, presented at 81st Annual Technical Conference and Exhibition in San Antonio, Texas on Sep. 24-27, 2006, 11 pages.

Grace, et al, "Geological applications of dipmeter and Borehole electrical images" Short Course Notes, Schlumberger Oilfield Services, vol. 8.1, 1998, 32 pages.

Greder, et al, "Determination of permeability distribution at log scale in vuggy carbonates" Paper BB, SPWLA 37th Annual Logging Symposium, Jun. 16-19, 1996, 14 pages.

Guardiano, et al, "Multivariate geostatistics: Beyond bivariate moments" Geostatistics-Troia, A. Soares. Dordrecht, Netherlands, Kluwer Academic Publications, vol. 1, 1993, pp. 133-144.

Harris, "Delineating and quantifying depositional facies patterns in carbonate reservoirs: Insight from modern analogs" AAPG Bulletin, vol. 94, No. 1, Jan. 2010, pp. 61-86.

Hartmann, et al, 1999, "Predicting Reservoir System Quality and Performance" in Beaumont E. A. and N.H. Foster, eds., AAPG Treatise of Petroleum Geology/Handbook of Petroleum Geology: Exploring for Oil and Gas Traps, Chapter 9, 1999, pp. 9-1 to 9-154.

Hassall, et al, "Comparison of permeability predictors from NMR, formation image and other logs in a carbonate reservoir" SPE 88683, presented at the Abu Dhabi International Petroleum Exhibition and Conference, Abu Dhabi, U.A.E., Oct. 10-13, 2004, 13 pages.

Höcker, et al, "Use of dipmeter data in clastic sedimentological studies" AAPG Bulletin, vol. 74, No. 2, Feb. 1990, pp. 105-118.

Cha et al., "Nontranslational three-dimensional profilometry by chromatic confocal microscopy with dynamically configurable micromirrow scanning," Applied Optics, Jun. 2000, vol. 39(16): pp. 2605-2613.

"Summary of FY 2008 Geosciences Research," U.S. Department of Energy, Office of Science: Washington, D.C., Nov. 2008: pp. 1-260.

Creath, "Surface Profilometry: State of the Art," 1992: pp. 2.1-2.20, <http://www.tesisenred.net/bitstream/handle/10803/6745/03CHAPTER2.pdf?sequence=3>.

International Search Report of PCT Application No. PCT/US2009/040198 dated Nov. 19, 2009: pp. 1-3.
International Search Report of PCT Application No. PCT/US2009/040210 dated Dec. 18, 2009: pp. 1-3.
International Search Report of PCT Application No. PCT/US2010/040363 dated Apr. 5, 2011: pp. 1-3.
International Search Report of PCT Application No. PCT/US2010/040378 dated Apr. 5, 2011: pp. 1-3.
International Preliminary Report on Patentability of PCT Application No. PCT/US2010/040378 dated Jan. 4, 2012: pp. 1-5.
Akbar et al., "A Snapshot of Carbonate Reservoir Evaluation," Oilfield Review, Winter 2000/2001: pp. 20-41.
Caers et al., "SPE 49026: Stochastic Reservoir Simulation Using Neural Networks Trained on Outcrop Data," SPE International, 1998: pp. 321-336.
Coates et al., "NMR Logging Principles and Applications," Halliburton Energy Services, 1999: pp. 1-234.
Eaton, "On the importance of geological heterogeneity for flow simulation," Sedimentary Geology, 2006, vol. 184: pp. 187-201.
Gonzalez et al., "SPE 111453: Development and Application of an Integrated Clustering/Geostatistical Approach for 3D Reservoir Characterization, SACROC Unit, Permian Basin," SPE International, 2007: pp. 1-41.
Gunter et al., "SPE 38679: Early Determination of Reservoir Flow Unites Using an Integrated Petrophysical Method," SPE International, 1997: pp. 1-8.
Harris, "Delineating and quantifying depositional facies patterns in carbonate reservoirs: Insight from modern analogs," AAPG Bulletin, Jan. 2010, vol. 94(1): pp. 61-86.
Hornby, "Imaging of Near-Borehole Structure with the Array Sonic Tool," Aug. 2001: pp. 124-128.
Hurley et al., "Flow Unit Determination in a Vuggy Dolomite Reservoir, Dagger Draw Field, New Mexico," SPWLA 40th Annual Logging Symposium, May-Jun. 1999: pp. 1-14.
Inoué, "Foundations of Confocal Scanned Imaging in Light Microscopy," Handbook of Biological Confocal Microscopy, Third Edition, ed. James B. Pawley, New York: Springer Science + Business Media, 2006: pp. 1-19.
Knackstedt et al., "SCA2006-23: 3D Imaging and Flow Characterization of the Pore Space of Carbonate Core Samples," International Symposium of the Society of Core Analysts, Sep. 2006: pp. 1-13.
Landa et al., "SPE77430: Sensitivity Analysis of Petrophysical Properties Spatial Distributions, and Flow Performance Forecasts to Geostatistical Parameters Using Derivative Coefficients," SPE International, 2002: pp. 1-14.
Liu et al., "SPE 90643: Merging Outcrop Data and Geomechanical Information in Stochastic Models of Fractured Reservoirs," SPE International, 2004: pp. 1-10.
Montaron, "SPE 105041: A Quantitative Model for the Effect of Wettability on the Conductivity of Porous Rocks," SPE International, 2007: pp. 1-14.
Parra et al., "Wave attenuation attributes as flow unite indicators," The Leading Edge, Jun. 2002: pp. 564-574.
Phillips et al., "Measuring physical density with X-ray computed tomography," NDT&E International, 1997, vol. 30 (6): pp. 339-350.
Serra, "Formation MicroScanner Image Interpretation," Schlumberger Educational Services, 1989: pp. 1-88.
Wei et al., "Confocal white light profilometry as a tool for surface studies of paintings," Retrieved Jun. 12, 2009: pp. 1-2.
Wu et al., "SCA2007-16: Reconstruction of Multi-Scale Heterogeneous Porous Media and Their Flow Prediction," International Symposium of the Society of Core Analysts, Sep. 2007: pp. 1-12.
Zeiss, "LSM 700," Carl Zeiss MicroImaging GmbH, Dec. 2008: pp. 1-34.
Royo Royo, "Chapter 2: Surface profilometry: state of the art," Topographic measurements of non-rotationally symmetrical concave surfaces using Ronchi deflectometry, Polytechnic University of Catalonia, Barcelonatech, Jul. 1999: pp. 2.1-2.20, <http://hdl.handle.net/10803/6745>.

* cited by examiner

WIDEFIELD ILLUMINATION (LARGE VOLUME)

POINT SCANNING (SMALL VOLUME)

COVER GLASS
SPECIMEN
MICROSCOPE SLIDE
EXCITATION BEAM

WIDEFIELD VERSUS CONFOCAL POINT SCANNING OF SPECIMENS

WIDEFIELD / CONFOCAL
POLLEN · MUSCLE · BONE

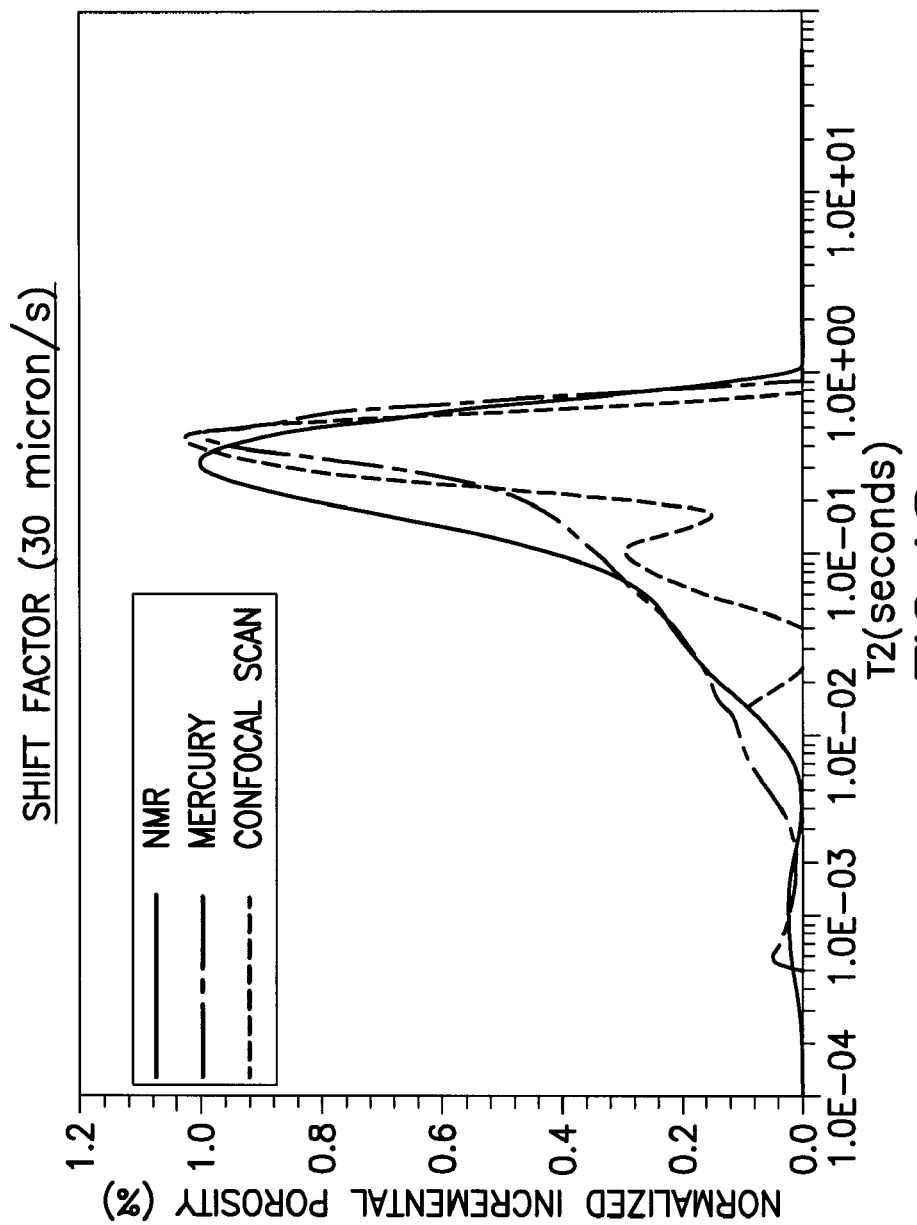

METHOD TO QUANTIFY DISCRETE PORE SHAPES, VOLUMES, AND SURFACE AREAS USING CONFOCAL PROFILOMETRY

BACKGROUND OF THE INVENTION

1. Field of the Invention

The present invention generally relates to methods for characterizing a sample of porous media using at least one measuring device along with a multipoint statistical (MPS) model. In particular, the invention relates to a method for characterizing flow properties of the sample whereby flow simulation models are generated from one or more set of reflected measured data provided by the at least one measuring tool in combination with the MPS model.

2. Background of the Invention

The principle of confocal imaging was patented by Marvin Minshy in 1957 (see U.S. Pat. No. 3,013,467 dated Nov. 7, 1957 issued to Marvin Minshy). In a conventional fluorescence microscope, the sample is flooded in light from a light source. Due to the aspects of light intensity traveling over a distance, all parts of the sample throughout the optical path will be excited and the fluorescence detected by a photodetector.

However, confocal microscope uses point illumination and a pinhole in an optically conjugate plane in front of the detector to eliminate out-of-focus information. Only the light within the focal plane can be detected, so the image quality is much better than that of wide-field images. As only one point is illuminated at a time in confocal microscopy, 2D or 3D imaging requires scanning over a regular raster (i.e. a rectangular pattern of parallel scanning lines) in the specimen. The thickness of the focal plane is defined mostly by the inverse of the square of the numerical aperture of the objective lens, and also by the optical properties of the specimen and the ambient index of refraction. These microscopes also are able to see into the image by taking images at different depths (see Wikipedia (2009)).

In particular, confocal microscopy is widely used in the life sciences and semiconductor industries (see Stevens, J. K., Mills, L. R., and Trogadis, J. E., 1994, Three-dimensional confocal microscopy: Volume investigation of biological specimens: Academic Press, San Diego, Calif., 506 p.; Matsumoto, B., 2002, Cell biological applications of confocal microscopy: Academic Press, San Diego, Calif., $2^{nd}$ edition, 499 p.; Pawley, J. B., 2006, Handbook of biological confocal microscopy: Springer, New York, N.Y., $3^{rd}$ edition, 985 p.; Nikon, 2009, http://www.microscopyu.com/articles/confocal/index.html, accessed on March 30; and Olympus, 2009a, http://www.olympusconfocal.com/theory/confocalintro.html, accessed on March 30). FIG. 1 shows the basic principles of confocal microscopy, In particular, FIG. 1 shows features that include detector pinhole and parallel focal planes at different levels in the specimen (see Olympus (2009a)).

FIG. 2 provides a comparison of conventional widefield (left) vs. confocal (right) microscopy. Further, FIG. 3 shows images of biological specimens that show a comparison between conventional widefield (top) vs. confocal (bottom) microscopy. From Olympus (2009a). It is noted that the the confocal image is a high-resolution measurement of a single focused point on the specimen. From Olympus (2009a). Further, it is noted confocal microscopy is not commonly used in the earth sciences. Fredrich et al. (1995) and Fredrich (1999) created 3D images of rocks using transmitted laser confocal microscopy (see Fredrich, J. T., 1999, 3D imaging of porous media using laser scanning confocal microscopy with application to microscale transport processes: Physics and Chemistry of the Earth, Part A: Solid Earth and Geodesy, v. 24, Issue 7, p. 551-561; and Fredrich, J. T., Menendez, B., and Wong, T. F., 1995, Imaging the pore structure of geomaterials: Science, v. 268, p. 276-279). O'Connor and Fredrich (1999) did flow experiments on these numerical rocks using lattice-Boltzmann methods (see O'Connor, R. M., and Fredrich, J. T., 1999, Microscale flow modeling in geologic materials: Physics and Chemistry of the Earth, Part A: Solid Earth and Geodesy, v. 24, Issue 7, p. 611-616). Li and Wan (1995) used confocal laser microscopy to image asphaltene particles (see Li, H., and Wan, W. K., 1995, Investigation of the asphaltene precipitation process from Cold Lake bitumen by confocal scanning laser microscopy: SPE Preprint 30321, Presented at the International Heavy Oil Symposium, Calgary, Alberta, Canada, June 19-21).

White-Light Confocal Profilometers are commercially available, and are mainly used to study surface roughness of industrial materials. As an example, the Nanovea ST400 Profiler from Microphotonics (2009) measures fine-scale topography of a surface using white-light non-contacting confocal profilometry. Various probes are available, each with a different spot size, vertical resolution, and depth of field.

Mell (2006) stated that, "The axial chromatism technique uses a white light source, where light passes through an objective lens with a high degree of chromatic aberration (see Mell, B., Analytical report Nanovea—061213-21: Microphotonics internal report, 10 p., 2006). The objective lens' refractive index will vary in relation to the wavelength of the light. In effect, each separate wavelength of the incident white light will refocus at a different distance from the lens (different height). When the measured sample is within the range of possible heights, a single monochromatic point will be focalized and form the image. Due to the confocal configuration of the system only the wavelength in focus will pass through the spatial filter with high efficiency, thusly causing all other wavelengths to be out of focus."

Laser Confocal Profilometry or laser confocal microscopes are commercially available, and are mainly used for metrology, i.e., the measurement of industrial materials. As an example, the Olympus (2009b) LEXT OLS3000 confocal laser scanning microscope measures fine-scale topography of surfaces using non-contact laser profilometry. Resolution is a function of the objective lens. The device uses a purple semiconductor laser with a wavelength of 408 nm.

Pore-Size Distribution

Pore-Size Distribution can be defined in at least one aspect as variations in pore sizes in reservoir formations, wherein each type of rock has its own typical pore size and related permeability.

For example, referring to FIG. 4, carbonate rocks have pore sizes that range over at least 9 orders of magnitude, from km-scale caves to micropores at submicron-scale. Pores are subdivided into pore bodies and pore throats. In particular, FIG. 4 illustrates a pore network consisting of a pore body and connected pore throats. In numerical pore-network models, pore bodies are spherical in shape and pore throats are circular, rectangular, or triangular in cross section.

FIG. 5 shows pore bodies and pore throats that can be subdivided into macro-, meso- and micropores following the definition of Marzouk et al. (1995), as implemented on borehole log data (Hassall et al., 2004; Gomaa et al., 2006) for pore throats, and Tanprasat (2005) for pore bodies (see Marzouk, I., Takezaki, H., and Miwa, M., 1995, Geologic controls on wettability of carbonate reservoirs, Abu Dhabi, U.A.E.: SPE Preprint 29883, Presented at the Middle East Oil Show, March 11-14; Hassall, J. K., Ferraris, P., Al-Raisi, M., Hurley, N. F., Boyd, A., and Allen, D. F., 2004, Comparison of permeability predictors from NMR, formation image and other logs in a carbonate reservoir: SPE Preprint 88683, Presented at $12_{th}$ Abu Dhabi International Petroleum Exhibition and Conference, October 10-13; Gomaa, N. M., Allen, D. F., Zammito, S., Okuyiga, M. O., Azer, S. R., Ramamoorthy, R., and Bize, E., 2006, Case study of permeability, vug quantification, and rock typing in a complex carbonate: SPE Preprint 102888, presented at $81_{st}$, Annual Technical Conference and Exhibition, September 24-27; and Tanprasat, S. J., 2005, Petrophysical analysis of vuggy porosity in the Shu'aiba formation of the United Arab Emirates: MSc thesis, Colorado School of Mines, Golden, Colo., 190 p.).

It is noted that pore-size distributions are typically shown as histograms of frequency vs. radius. Radius is generally 2D, and can be determined using various image-analysis approaches. Examples of such approaches are:

1) Core-slab photography—This technique, summarized by Hurley et al. (1998; 1999), involves coating core slabs with water-soluble, fluorescent paint. Photos taken under black light are processed using image-analysis software to determine 2D pore-size distributions (see Hurley, N. F., Zimmermann, R. A., and Pantoja, D., 1998, Quantification of vuggy porosity in a dolomite reservoir from borehole images and core, Dagger Draw field, New Mexico: SPE 49323, presented at the 1998 Annual Conference and Exhibition, New Orleans, La., September, 14 p. Jennings, J. B., 1987, Capillary pressure techniques: Application to exploration and development geology: AAPG Bulletin, v. 71, p. 1196-1209; and Hurley, N. F., Pantoja, D., and Zimmermann, R. A., 1999, Flow unit determination in a vuggy dolomite reservoir, Dagger Draw field, New Mexico: Paper GGG, SPWLA 40th Annual Logging Symposium, Oslo, Norway, May 30-June 3, 14 p.).

2) Petrographic image analysis—This technique, summarized by Anselmetti et al. (1998), involves image analysis of thin sections. The smallest pores are generally the thickness of a thin section. The largest pores are constrained by the area of the scan (see Anselmetti, F. S., Luthi, S., and Eberli, G. P., 1998, Quantitative characterization of carbonate pore systems by digital image analysis: AAPG Bulletin, v. 82, p. 1815-1836).

Pore-size distributions can also be determined from methods that deal with bulk-rock samples. Examples are:

1) Mercury injection capillary pressure (MICP). Referring to FIG. 6, this technique, summarized by Jennings (1987) and Pittman (1992), involves progressive injection of mercury into a rock at higher and higher pressures (see Jennings, J. B., 1987, Capillary pressure techniques: Application to exploration and development geology: AAPG Bulletin, v. 71, p. 1196-1209; and Pittman, E. D., 1992, Relationship of porosity and permeability to various parameters derived from mercury injection-capillary pressure curves for sandstone: AAPG Bulletin, v. 76, p. 191-198). At each increased pressure step, pore throats of a particular size are invaded by mercury. Mercury invades all pore bodies connected to the outside of the core plug and pore throats of the size that are currently being invaded. MICP is not useful for some pore throats because these throats are filled at very low injection pressures. Pore-throat size distributions are generally shown as histograms, which are computed from MICP results (FIG. 6). In particular, FIG. 6 shows pore-throat size distribution from conventional mercury injection capillary pressure (MICP) data for a carbonate rock sample. The conventional MICP results are converted to the radius of the pore throats (x axis) and the volumes of both pore throats and connected pore bodies (y axis), i.e., r vs. (v+V) in FIG. 4.

2) Constant rate mercury injection (CRMI). Referring to FIG. 7, this technique maintains a constant injection rate and monitors fluctuations of the injection pressure (see Yuan, H. H. and B. F. Swanson, 1989, Resolving pore-space characteristics by rate-controlled porosimetry: SPE Formation Evaluation, v. 4, p. 17-24). The injection rate is kept extremely low so that the pressure loss due to flow inside the sample is negligible compared to the capillary pressure. In this case, the observation of a sudden pressure drop is the result of the movement of mercury from pore throats into pore bodies, and is accompanied by mercury instantaneously filling the pore bodies (FIG. 7). In particular, FIG. 7(A) shows CRMI injection pressure vs. volume results for a Berea sandstone sample of 1.5 mL volume (adapted from Chen and Song, 2002 (see Chen, Q., and Song, Y.-Q., 2002, What is the shape of pores in natural rocks?: Journal of Chemical Physics, v. 116, p. 8247-8250)). P(R) is the capillary pressure of a pore body with radius of R and this pore body is connected by a pore throat with capillary pressure of p and radius of r (P<p, R>r). Further, FIG. 7(B) shows CRMI capillary-pressure curves for a Berea sandstone sample (modified from Yuan and Swanson, 1989). Conventional MICP provides the total capillary-pressure curve, whereas CRMI provides pore-body and pore-throat capillary-pressure curves. The further rise of injection pressure corresponds to the filling of pore throats with smaller radius. The volume of pore bodies can be determined from the injection rate and the time it takes to fill the pore bodies. Therefore, CRMI provides the conventional MICP curve, and it also provides the size distributions of pore bodies and pore throats.

3) Micro-CT scans. Referring to FIG. 8, this technique, summarized in Knackstedt et al. (2004), uses x-ray computed tomography (CT) on small samples (commonly 5-mm diameter core plugs) to detect pore bodies (see Knackstedt, M. A., Arns, C. H., Sakellariou, A., Senden, T. J., Sheppard, A. P., Sok, R. M., Pinczewski, W. V., and Bunn, G. F., 2004, Digital core laboratory: Properties of reservoir core derived from 3d images: SPE Preprint 87009, Presented at the Asia-Pacific Conference on Integrated Modelling for Asset Management, March 29-30). Software converts physical pore images into pore-network models, with their resulting pore-body and pore-throat size distributions (FIG. 8). In particular, FIG. 8 shows a physical pore network showing pores in green (left) generated from microCTscan, and pore-network model (right). The size of the cube on the left is 3 mm on each side. On the right, the balls represent pore bodies and the sticks represent pore throats.

4) Nuclear magnetic resonance (NMR). This technique, summarized by Coates et al. (1999), is based on the interaction of hydrogen nuclei (protons) with a magnetic field and pulses of radio-frequency signals (see Coates, G. R., Xiao, L. and Prammer, M. G., 1999, NMR logging: Principles and applications: Halliburton Energy Services, USA, 234 p.). The NMR transverse relaxation time distribution ($T_2$ distribution) is mostly related to pore-size distribution in the rock, although transverse relaxation is also related to factors such as surface relaxivity and fluid type. Research has shown that grain-surface relaxation has the most important influence on $T_2$ relaxation times for rocks. Surface relaxivity ($\rho$) is a measure of the ability of grain surfaces to cause nuclear-spin relaxation. Different rocks have different surface-relaxivity characteristics. The rate of proton grain-surface relaxation depends on how often protons collide with or get close enough to interact with grain surfaces. As a result, the surface to volume (S/V) ratio of rock pores significantly influences NMR relaxation times. For spherical pores, S/V is proportional to the inverse of the pore radius. Larger pores have therefore relatively smaller S/V ratios and proportionally longer relaxation times. Smaller pores have relatively larger S/V ratios, resulting in shorter relaxation times. NMR surface relaxivity is characterized by the following equations:

$$\left(\frac{1}{T_2}\right)_s = \rho \frac{S}{V} \text{ and } \left(\frac{1}{T_2}\right)_s = \rho_e r$$

where $\rho$ is surface relaxivity in units of $\mu$/s, S is surface area ($\mu^2$), V is volume ($\mu^3$), $\rho_e$ is effective relaxivity ($\mu$/s), and r is radius ($\mu$). Thus, we can obtain pore-size distribution information from NMR $T_2$ distributions.

Multipoint Statistics

Multipoint (or multiple-point) statistical methods (MPS) are a new family of spatial statistical interpolation algorithms proposed in the 1990s that are used to generate conditional simulations of discrete variable fields, such as geological facies, through training images (see Guardiano, F., and Srivastava, R. M. 1993, Multivariate geostatistics: Beyond bivariate moments: Geostatistics-Troia, A. Soares. Dordrecht, Netherlands, Kluwer Academic Publications, v. 1, p. 133-144). MPS is gaining popularity in reservoir modeling because of its ability to generate realistic models that can be constrained by different types of data. Unlike the conventional 2-point or variogram-based geostatistical approaches, MPS uses a training image to quantify the complex depositional patterns believed to exist in studied reservoirs. These training patterns are then reproduced in the final MPS models with conditioning to local data collected from the reservoirs. Therefore, MPS allows modelers to use their prior geological interpretations as conceptual models (training images) in the reservoir modeling process and to evaluate the uncertainty associated with the prior interpretations by using different training images.

In addition to categorical variables, MPS can also be used to deal with continuously variable training images, such as spatial distribution of porosity. Two families of MPS algorithms are available to handle these different types of training images: Snesim for categorical variables and Filtersim for continuous variables. Strebelle (2002) proposed an efficient Snesim algorithm that introduced the concept of a search tree to store all replicates of patterns found within a template over the training image (see Strebelle, S. 2002, Conditional simulation of complex geological structures using multiple point statistics: Mathematical Geology, v. 34, p. 1-22).

This makes Snesim code several orders of magnitude faster than the original algorithm proposed by Guardiano and Srivastava (1993). Filtersim, developed by Zhang (2006), applies a set of local filters to the training image, which can be either categorical or continuous, to group local patterns into pattern classes (see Zhang, T. 2006, Filter-based training image pattern classification for spatial pattern simulation. PhD dissertation, Stanford University, Palo Alto, Calif.). Pattern simulation then proceeds on the basis of that classification.

Snesim and Filtersim algorithms honor absolute, or "hard" constraints from data acquired in wells or outcrops, and other interpreted trend maps of the reservoir under study. Training images are the main driver of any MPS approach. An issue raised implicitly by current MPS algorithms is how to generate training images. Training images are supposed to model or reproduce real geological features and should as much as possible be derived from existing geologically meaningful images. This requires research on statistical and image-processing methods that will allow use of images from any source: hand-drawn sketches, aerial photographs, satellite images, seismic volumes, geological object-based models, physical-scale models, or geological process-based models.

Categorically variable training images are easier to generate than continuously variable training images. An object-based approach is commonly used to generate training images with categorical variables. A region-based approach, combined with the addition of desired constraints, can be used to generate continuously variable training images (Zhang et al., 2006).

U.S. Pat. No. 4,702,607 discusses a three dimensional structure viewer of a transparent object, but does not discuss porous media. Further, U.S. Pat. Nos. 6,288,782, 6,661,515, and 7,384,806 discuss the use of confocal microscopy to find defects on semiconductor wafers, however the shapes, volumes, or surface areas of such defects are not quantified. Further still, U.S. Pat. No. 6,750,974 discusses 3D imaging of droplets, however it does not disclose porous media. It is further noted that U.S. Pat. Nos. 7,092,107 and 7,230,725 provide a method to determine the 3D topology of objects, with a focus on teeth, however it does not discuss porous media.

Therefore, there is a need for methods and devices that overcome the above noted limitations of the prior art. By non-limiting example, devices and methods that can provide a quantitative evaluation of 3D pore-size distributions using 2D digital images by confocal profilometry scanning of rock samples. Further, there is a need for methods and devices that overcome the above noted limitations of the prior art that can use non-contacting white-light and laser confocal profilometry a method to quantify discrete pore shapes, volumes, and surface areas in porous media.

SUMMARY OF THE INVENTION

According to embodiments of the invention, the invention includes a method for characterizing a sample of porous media using at least one measuring device along with a multipoint statistical (MPS) model. The method comprising: a) retrieving one or more set of reflected measured data provided by the at least one measuring device of at least one portion of a surface of the sample in order to produce a sample imaging log, wherein the retrieved one or more set of measured data is communicated to a processor; b) using at least one noise reduction algorithm to identify noise data in the retrieved one or more set of measured data so that the identified noise data is one of removed from the retrieved one or more set of measured data, replaced with null values or both; c) selecting depth-defined surface portions of the sample from the sample imaging log as a training image for inputting in the MPS model; d) determining pattern based simulations from the training image using one of a pixel-based template which is applied to the training image; e) constructing from the pattern based simulations one or more complete-sampling image logs of surface portions of the sample; and f) repeat steps (b) to (e) through the one or more logged surface portions in order to construct three dimensional (3D) sample images from stacked successive pattern based simulations so as to construct at least one 3D model of the sample.

According to aspects of the invention, the method further comprises the step (g), using the at least one 3D model of the sample to compute one of a 3D pore surface area, a 3D pore volume, one or more 3D flow simulation model to assist in determining flow properties of the sample, a 3D flow simulation model computed after the conversion of at least one pore-network model or some combination thereof, so as to analyze the flow properties of the sample.

According to aspects of the invention, the one or more set of reflected measured data can include data gathered from a confocal profilometry measuring device of the at least one measuring device such that the confocal profilometry measuring device includes a white light. Further, the white-light confocal profilometry measuring device reflects light from the surface of the sample positioned on a movable stage, thereby producing an x-y grid of z-values or depths that measures a microtopography of the surface of the sample. Further still, the retrieved one or more set of reflected measured data can be gathered from the confocal profilometry measuring device which provides for computing one of a pore-size distribution, a pore shape factor, at least one pore network model, a pore diameter or a surface area and surface volume of one or more pores on the sample. It is possible, the retrieved one or more set of measured data can include data relating to the at least one portion of the surface of the sample in terms of one of a pore, a pore depth, a pore volume, a pore shape, a surface area for each discrete pore or some combination thereof.

According to aspects of the invention, the method can include at least one noise reduction algorithm that includes a spike spatial filter algorithm that identifies spike noise data, whereby the identified spike noise data is removed from the retrieved one or more set of reflected measured data and replaced with null values so as to complete the training image. Further, the spike noise data is data that is recorded depth values larger than a maximum cutoff value or less than a minimum cutoff value.

According to aspects of the invention, the method can include that each null value of the null values are derived from nearby values of each respective removed spike location, such that the null values provide for completing the training image. Further, the at least one noise reduction algorithm can include one of a leveling algorithm, the leveling algorithm with a least-squares plane-leveling algorithm, an other noise reduction algorithm or some combination thereof. It is noted that the spike spatial filter algorithm can be a truncation plane algorithm that identifies spike noise data such that the identified spike noise data is removed from the retrieved one or more set of measured data so as to reduce the noise. It is also possible that the sample imaging log can include one of unidentified sample image data, data gaps or some combination thereof, that consists of data gathered due to vibration during acquisition, data gathered due to electronic malfunctions from the at least one measuring device, data gathered due to external effects external to the at least measuring device, other outside noise related data or combination thereof.

According to aspects of the invention, the method can include at least one measuring device that is from the group consisting of one of transmitted confocal microscopy, white-light confocal profilometry, laser confocal profilometry or some combination thereof. It is noted that the sample can be shaped as one of a uniform geometric shape, a non-uniform geometric shape or some combination thereof.

According to aspects of the invention, the method of step (f) can further comprise of using each logged surface portion of the one or more logged surface portions to generate a mirror image logged surface portion, then juxtapose the generated mirror image logged surface portion with the logged surface portion that was mirror after, wherein both logged surface portions are stacked such that a spacing that equals a deepest pore modeled in each logged surface portion, results in a stacked series of pores that statistically match the retrieved one or more set of reflected measured data.

According to embodiments of the invention, the invention includes a method for characterizing a sample of porous media to identify flow properties of the sample whereby flow simulation models are generated from one or more set of reflected measured data provided by at least one measuring tool in combination with a multipoint statistical (MPS) model. The method comprising step a) retrieving the one or more set of reflected measured data which includes data of at least one portion of a surface of the sample so as to produce a sample imaging log, wherein the retrieved one or more set of measured data is communicated to a processor; step b) using at least one noise reduction algorithm to identify noise data in the retrieved one or more set of measured data so that the identified noise data is one of removed from the retrieved one or more set of measured data, replaced with null values or both; step c) selecting depth-defined surface portions of the sample from the sample imaging log as a training image for inputting in the MPS model; step d) determining pattern based simulations from the training image using one of a pixel-based template which is applied to the training image; step e) constructing from the pattern based simulations one or more complete-sampling image logs of surface portions of the sample; and step f) repeat steps (b) to (e) through the one or more logged surface portions in order to construct three dimensional (3D) sample images from stacked successive pattern based simulations which provides for constructing at least one 3D model of the sample, wherein the at least one 3D model of the sample provides for further constructing one or more flow simulation model so as to assist in determining flow properties of the sample.

According to aspects of the invention, the invention includes the sample imaging log having one of processed raw data that consists of measured values and non-measured values. The processed raw data can include processing the raw data by one of data leveling of the sample, data filtering for identifying noise so the noise data is removed, data filtering to identify spike data so the spike data is removed and replaced with the null values, multiplying shift depth values or x-y-z values by a constant to make a maximum frequency occur at a depth of z=0, subtracting values from a horizontal truncation plane or some combination thereof, such that the processed raw data is loaded into the MPS model so as to assist in determining flow properties of the sample.

According to aspects of the invention, the invention includes the constructed complete-sample image logs of surface portions of the sample can include plotting a digital file of the constructed complete-sample images onto one of a digital media or hard copy media. The sample is from a geological formation and shaped as one of a rectangle shape, a cylindrical shape, a shape having at least one planar surface or some combination thereof. Further, a set of depth-defined data from the retrieved one or more set of measured data in combination with the MPS model can provide for computing a surface training image of the at least one portion of the sample, such that spike noise data is identified and replaced with null values so as to generate a complete surface training image.

Another advantage of at least one embodiment of the invention is that the invention is capable of using the digital images obtained by confocal profilometry for directly using them as training images. Wherein, an MPS (Filtersim algorithm) can then be used to generate different 2D realizations of carbonate rock textures (vuggy porosity) for reconstructing vug distributions in 3D. Moreover, this can allow for the quantitative evaluation of 3D pore-size distributions using 2D digital images by confocal profilometry scanning of rock samples.

Another advantage of at least one embodiment of the invention is that the invention is capable of using non-contacting white-light and laser confocal profilometry as a method to quantify discrete pore shapes, volumes, and surface areas in porous media.

Further features and advantages of the invention will become more readily apparent from the following detailed description when taken in conjunction with the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 7B shows the CRMI capillary-pressure curves for a Berea sandstone sample (modified from Yuan and Swanson, 1989), such that the conventional MICP provides the total capillary-pressure curve, whereas CRMI provides pore-body and pore-throat capillary-pressure curves;

FIG. 18 shows a comparison of pore-size distributions from NMR, MICP, and confocal profilometry, along with all data that are shifted to overlie the T2 distribution, according to aspects of the invention;

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Further, like reference numbers and designations in the various drawings indicated like elements.

According to embodiments of the invention, the invention includes a method for characterizing a sample of porous media using at least one measuring device along with a multipoint statistical (MPS) model. The method comprising: a) retrieving one or more set of reflected measured data provided by the at least one measuring device of at least one portion of a surface of the sample in order to produce a sample imaging log, wherein the retrieved one or more set of measured data is communicated to a processor; b) using at least one noise reduction algorithm to identify noise data in the retrieved one or more set of measured data so that the identified noise data is one of removed from the retrieved one or more set of measured data, replaced with null values or both; c) selecting depth-defined surface portions of the sample from the sample imaging log as a training image for inputting in the MPS model; d) determining pattern based simulations from the training image using one of a pixel-based template which is applied to the training image; e) constructing from the pattern based simulations one or more complete-sampling image logs of surface portions of the sample; and f) repeat steps (b) to (e) through the one or more logged surface portions in order to construct three dimensional (3D) sample images from stacked successive pattern based simulations so as to construct at least one 3D model of the sample.

White-Light Confocal Profilometry

Figure 1:
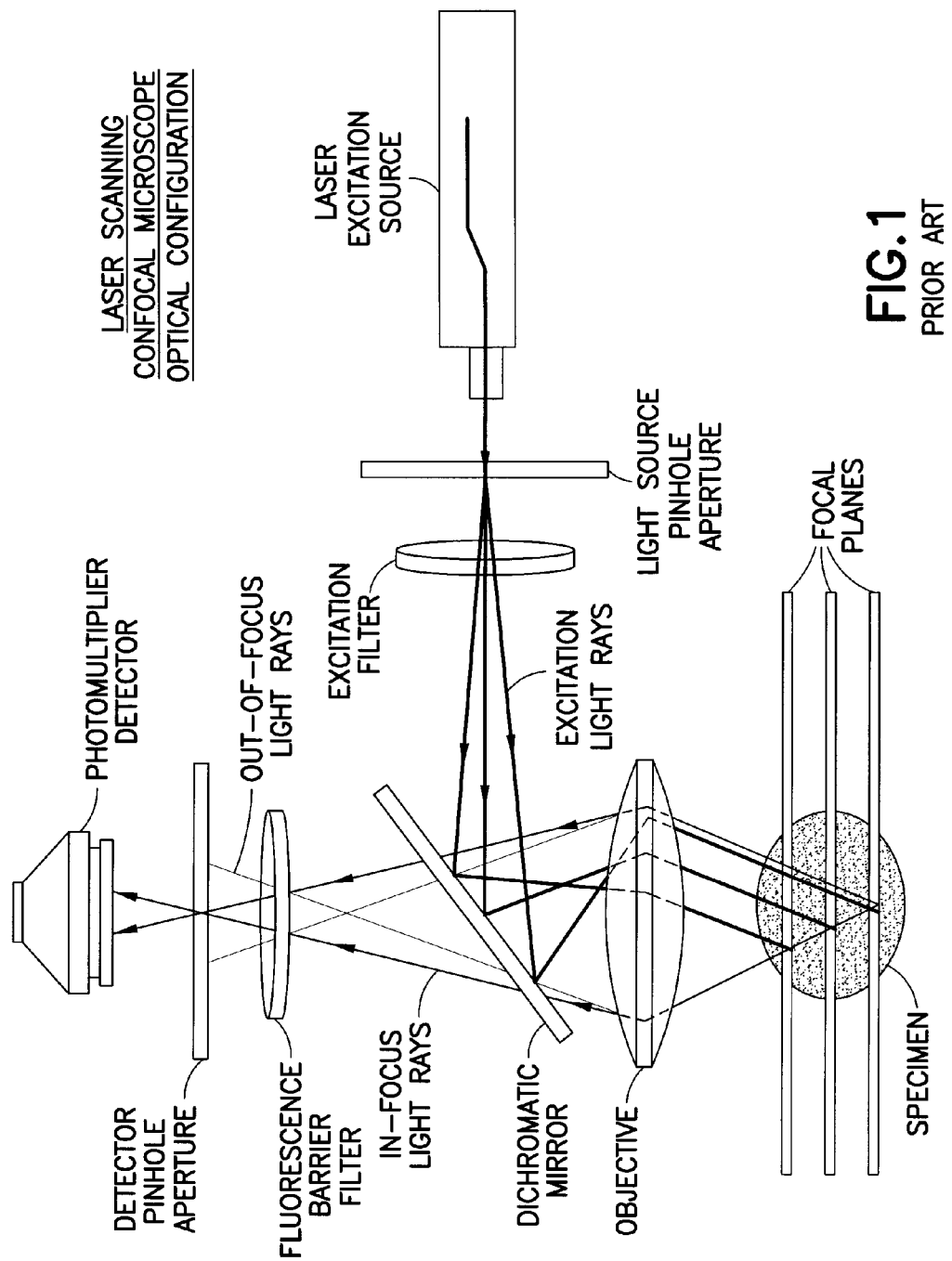
FIG. 1 shows prior art disclosing the basic principles of laser confocal microscopy wherein the key features include detector pinhole and parallel focal planes at different levels in the specimen (see Olympus (2009a))
Figure 2:
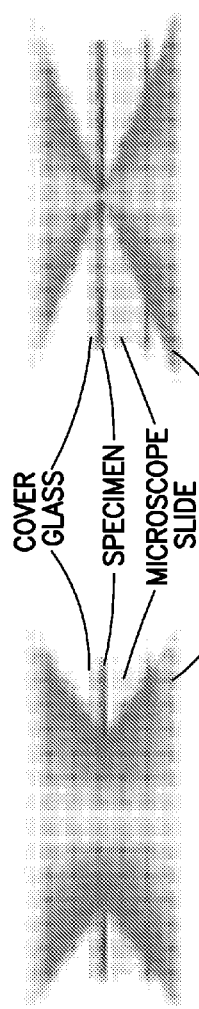
FIG. 2 shows prior art disclosing the comparison of conventional widefield (left) vs. confocal (right) microscopy, wherein the confocal image is a high-resolution measurement of a single focused point on the specimen (see Olympus (2009a))
Figure 3:
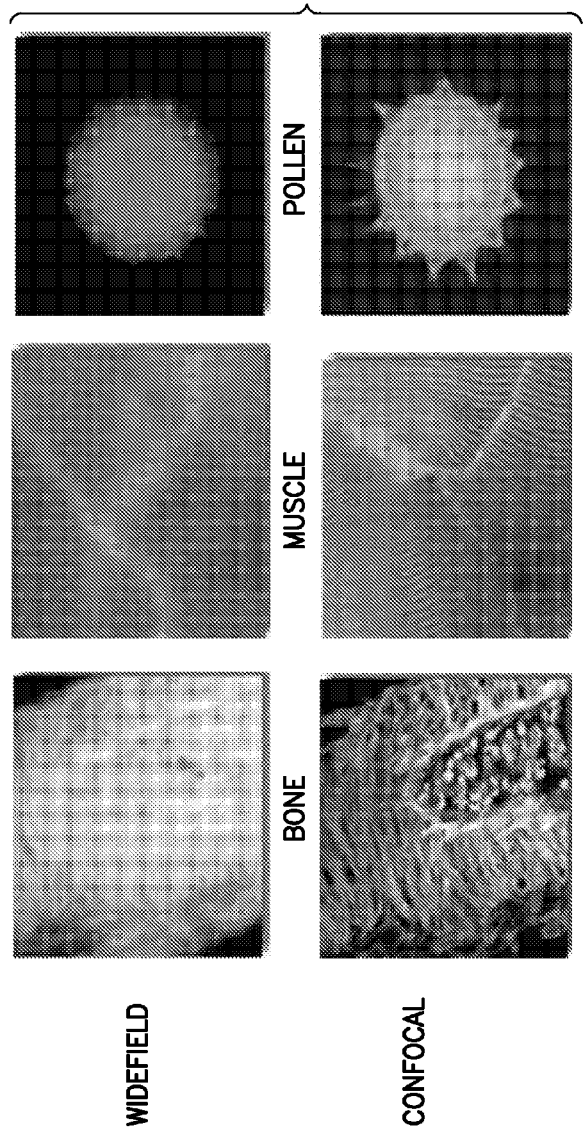
FIG. 3 shows prior art disclosing images of biological specimens that show comparison between conventional widefield (top) vs. confocal (bottom) microscopy (see Olympus (2009a))
Figure 4:
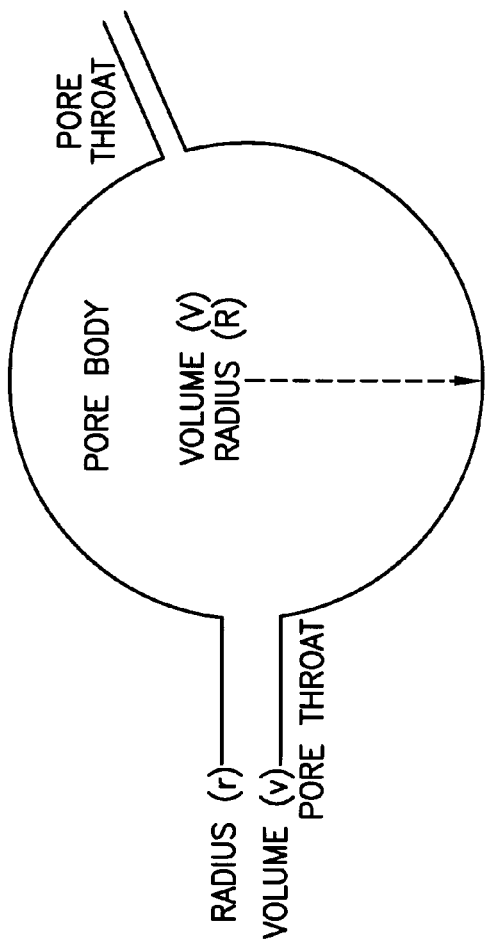
FIG. 4 shows prior art disclosing an illustration of a pore network consisting of a pore body and connected pore throats, wherein in numerical pore-network models, pore bodies are spherical in shape and pore throats are circular, rectangular, or triangular in cross section.
Figure 5:
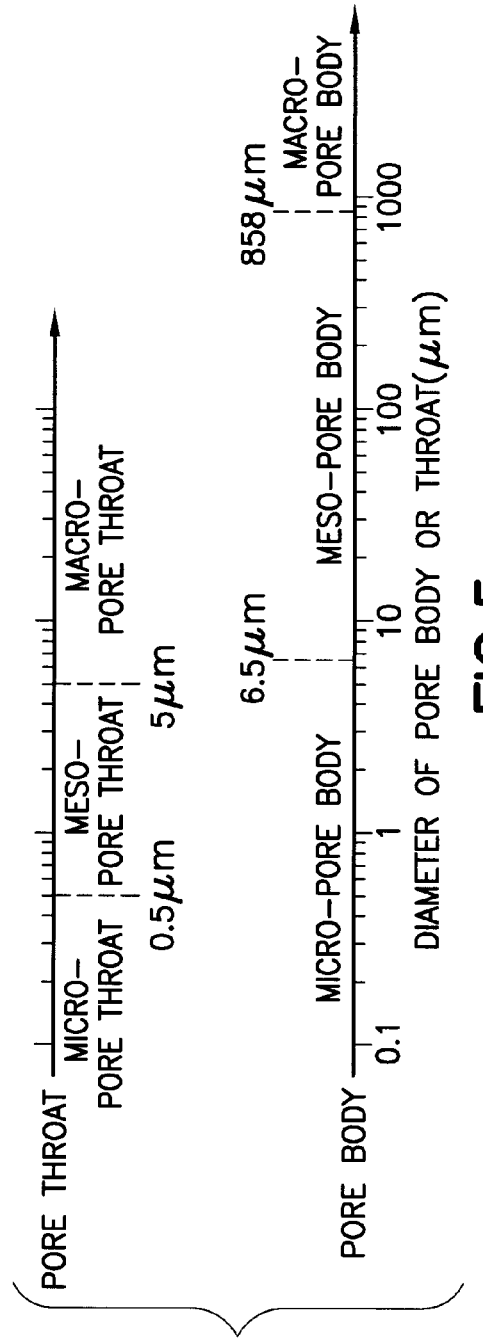
FIG. 5 shows prior art disclosing the pore bodies and pore throats that can be subdivided into macro-, meso- and micropores (see Marzouk et al. (1995), as implemented on borehole log data (see Hassall et al., 2004 and Gomaa et al., 2006) for pore throats, and for pore bodies (see Tanprasat (2005))
Figure 6:
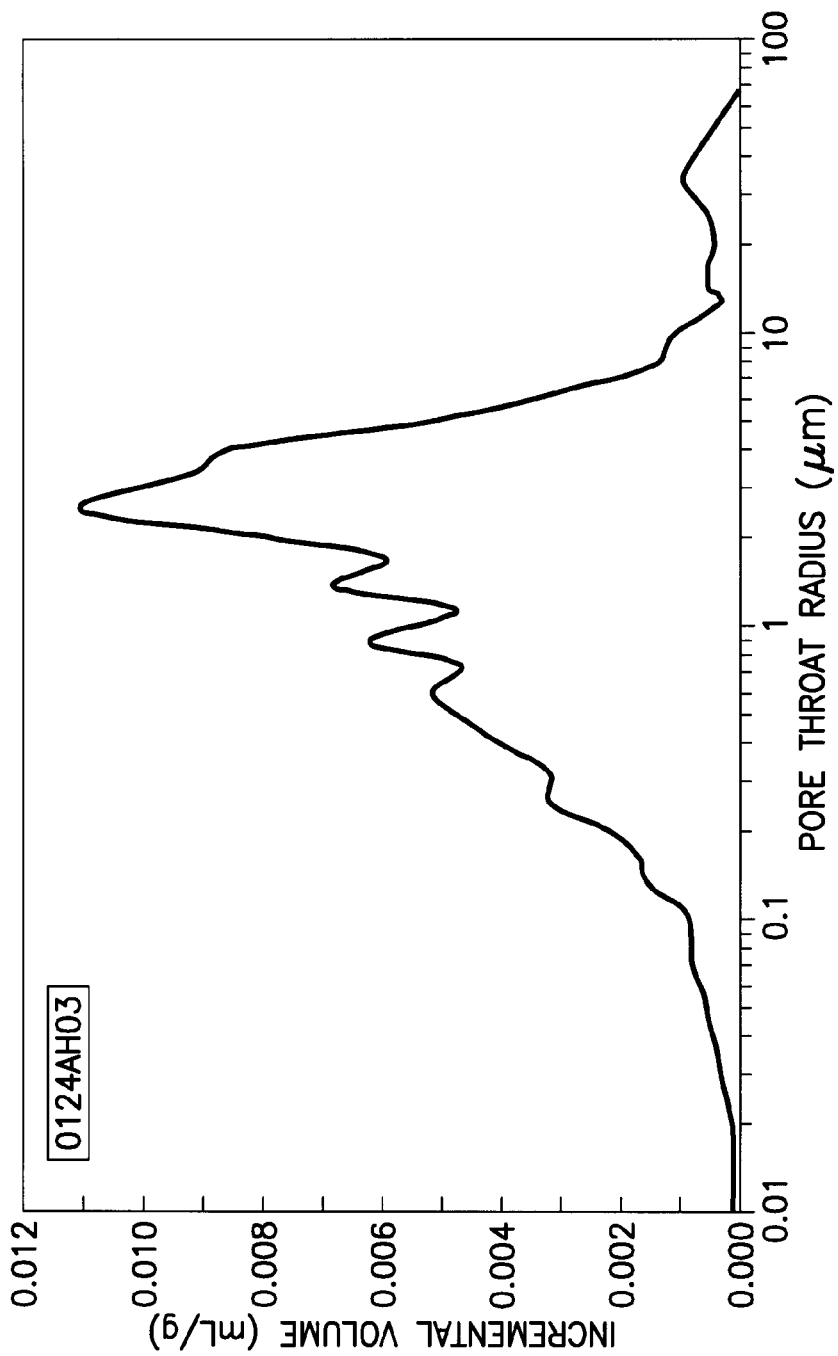
FIG. 6 shows prior art disclosing pore-throat size distribution from conventional mercury injection capillary pressure (MICP) data for a carbonate rock sample, such that the conventional MICP results are converted to the radius of the pore throats (x axis) and the volumes of both pore throats and connected pore bodies (y axis), i.e., r vs. (v+V) in FIG. 4.
Figure 7A:
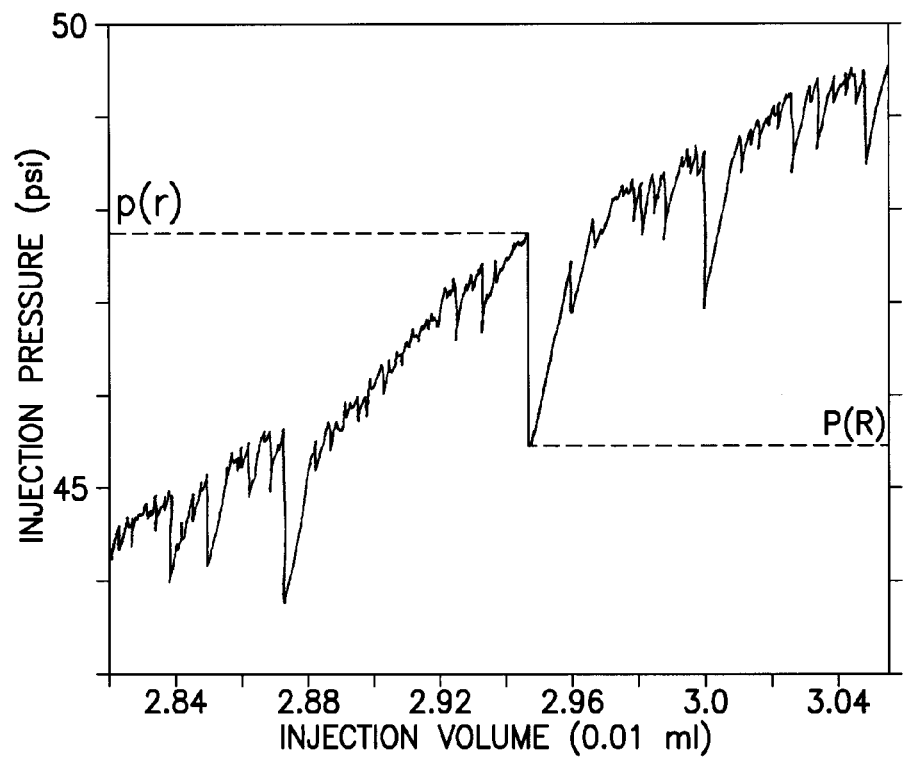
FIGS. 7A and 7B show the prior art disclosing in FIG. 7A the CRMI injection pressure vs. volume results for a Berea sandstone sample of 1.5 mL volume (adapted from Chen and Song, 2002) and the P(R) is the capillary pressure of a pore body with radius of R and this pore body is connected by a pore throat with capillary pressure of p and radius of r (P<p, R>r)
Figure 7B:
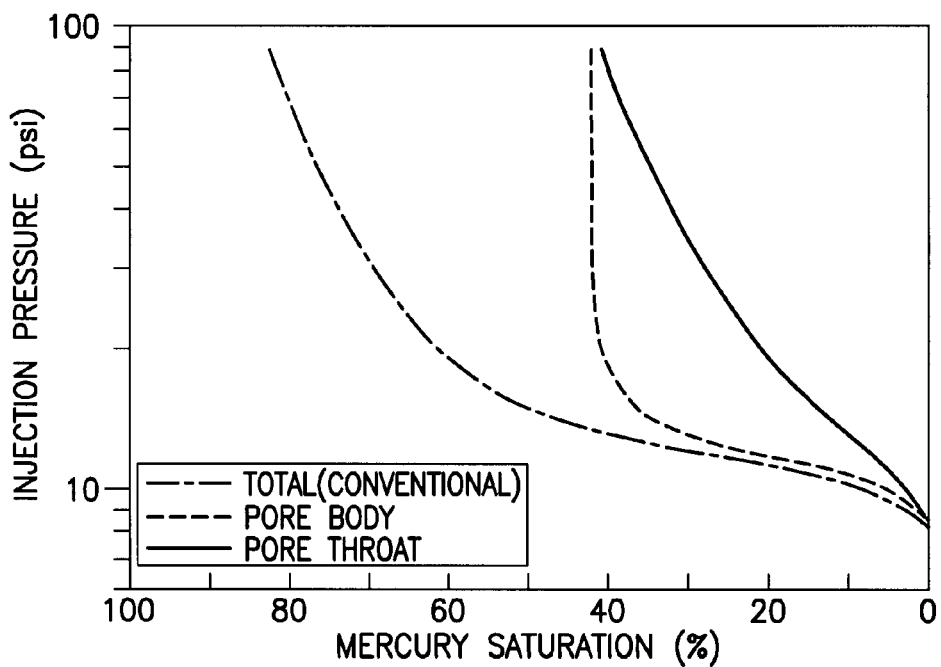
Figure 8:
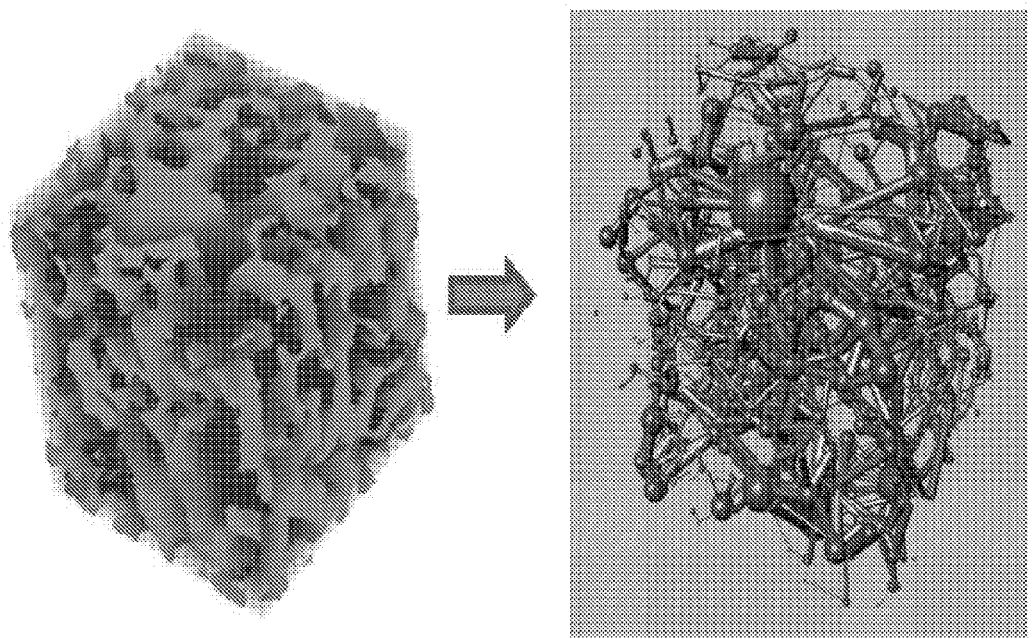
FIG. 8 shows prior art disclosing the physical pore network showing pores in green (left) generated from microCTscan, and pore-network model (right), wherein the size of the cube on the left is 3 mm on each side and on the right, the balls represent pore bodies and the sticks represent pore throats.
Figure 9:
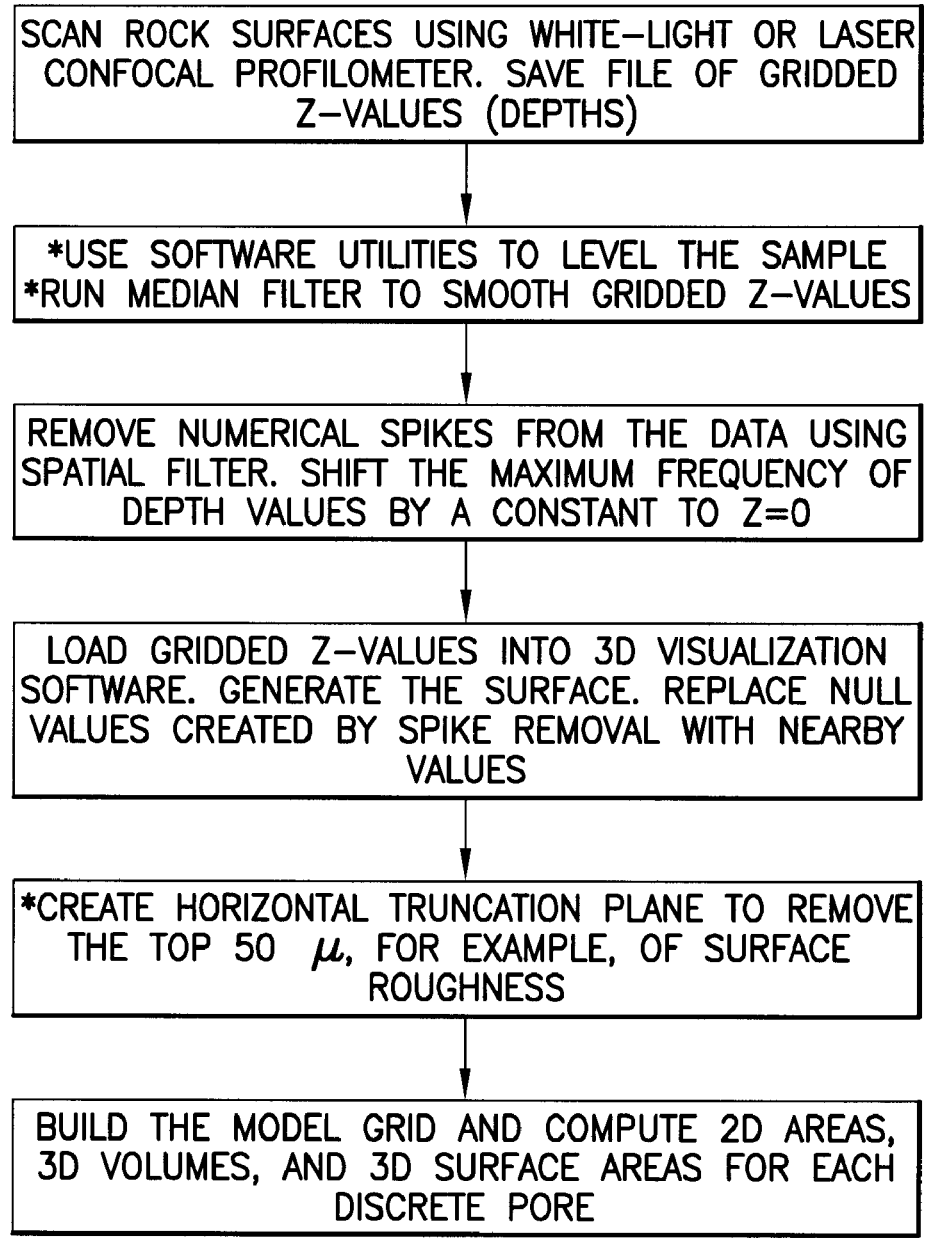
FIG. 9, shows by non-limiting example, a flow chart for white-light and laser confocal profilometry, according to at least one embodiment of the invention.

According to embodiments of the invention, the invention uses white-light and laser confocal profilometry to compute the shapes, volumes, and surface areas for each discrete pore in a porous media. The first set of descriptions and examples show white-light confocal profilometry. Further, methods for laser confocal profilometry, which are similar, are treated in the second set of descriptions and examples:

FIG. 9 shows a flow chart for white-light and laser confocal profilometry (the "*" in FIG. 9 represents an optional step, and may not be necessary), includes the following parts:

Part [1] Scan Rock Surface using Confocal Profiler

Figure 10:
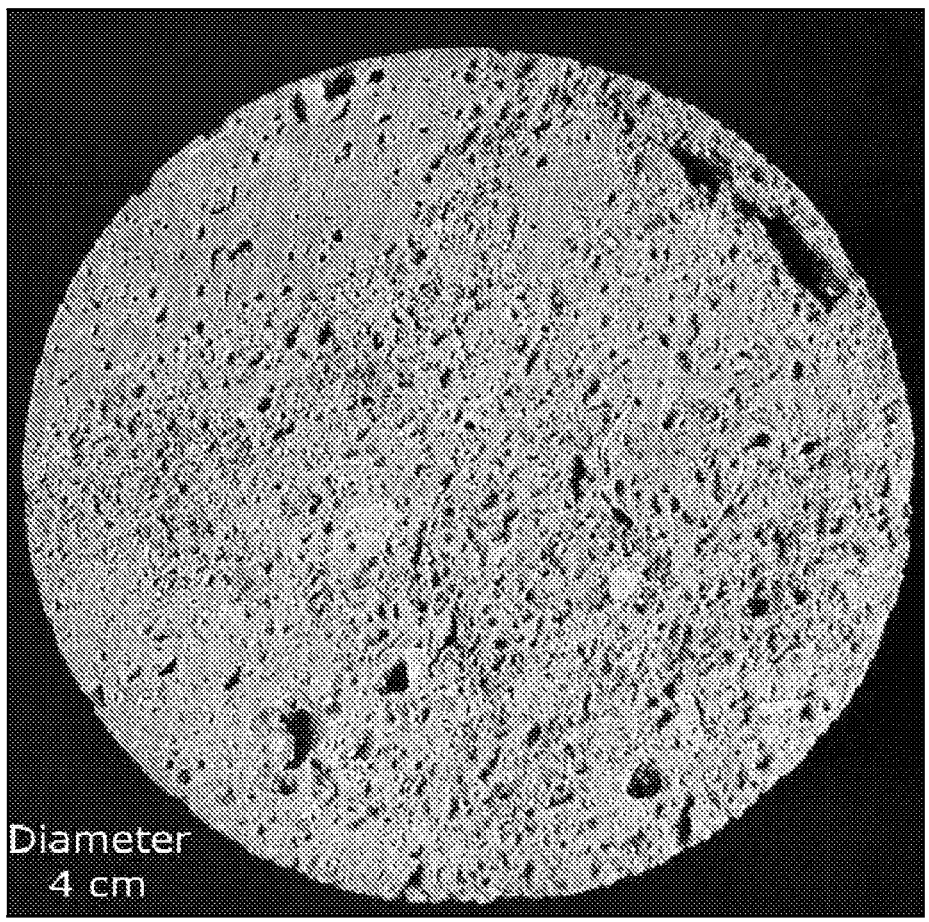
FIG. 10 shows a core plug with pores in a typical carbonate reservoir rock, according to aspects of the invention.
Figure 11:
FIG. 11 shows a confocal profilometer scan of a 2×2 cm rock surface that shows topography due to open pores (vugs) and the vertical exaggeration is 5×, along with the color scale depicts topography, according to aspects of the invention.

Referring to FIGS. 9-11, (1) Choose sample surfaces that are representative of the whole sample (see FIG. 10). In particular, FIG. 10 shows a core plug shows pores in a typical carbonate reservoir rock. Surfaces can be flat or cylindrical; (2) Scan the surface, for example, using 25×25μ step sizes, with a total scan area of 2×2 cm (see FIG. 11). In particular, FIG. 11, shows a confocal profilometer scan of a 2×2 cm rock surface that shows topography due to open pores (vugs) and the vertical exaggeration is 5×, along with the color scale depicts topography. If the surface is homogeneous and has no large pores (known as vugs), use a 15×15μ step size, and scan a total area of 1×1 cm instead. (3) Save the gridded z-values (depths) as, for example, .txt files.

Part [2] Level and Filter Scans

Still referring to FIGS. 9-11, (1) If the sample is tilted on the stage, it may be necessary to level the surface. If there are large pores, it is best to exclude them from the leveling process, which can be done using a least-squares plane-leveling algorithm. (2) Noise in the scan can be reduced by running, for example, a 3×3 median filter.

Part [3] Remove Spikes and Shift Depth Values

Figure 12:
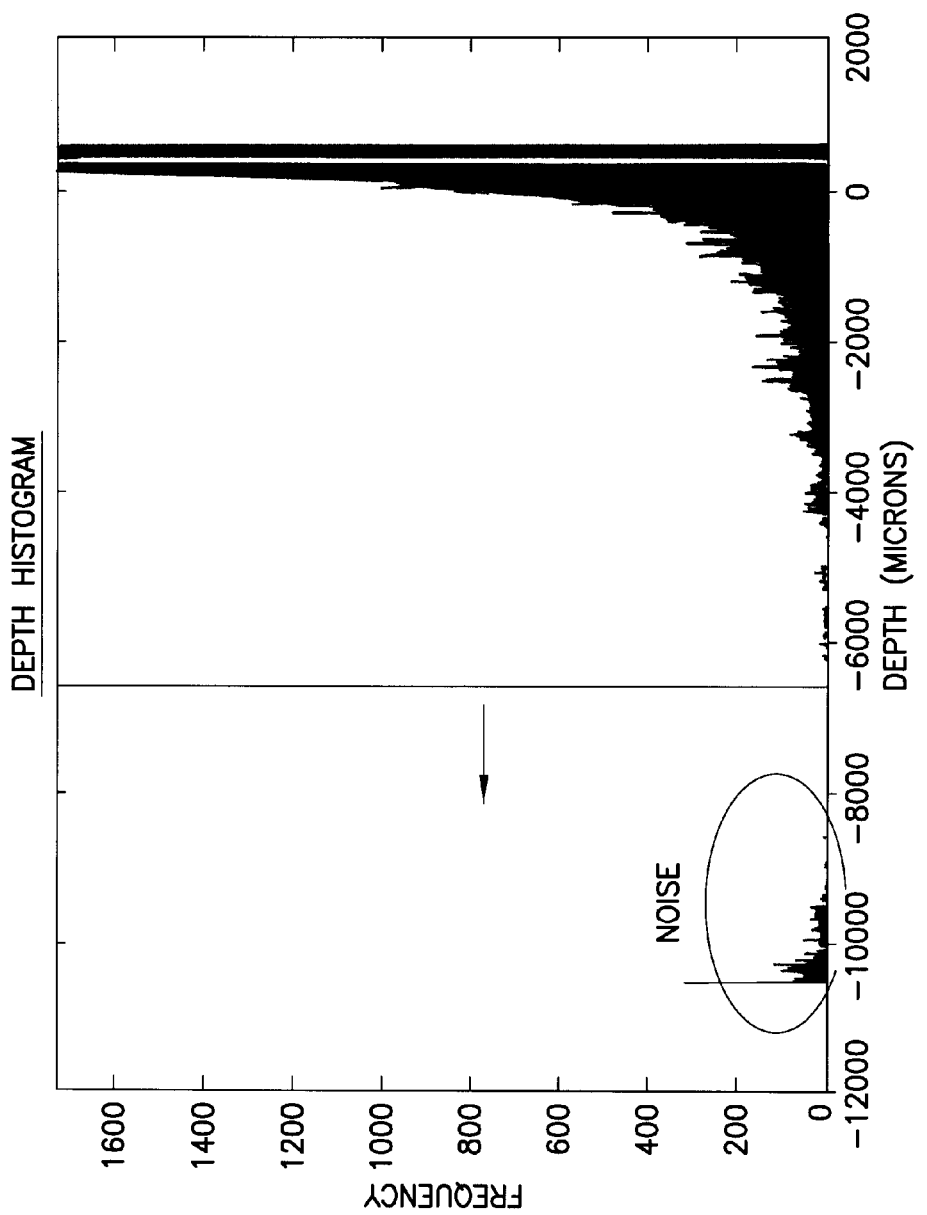
FIG. 12 shows a histogram of depth distribution used to determine the cutoffs for noise, notice that depth values have been multiplied by 1,000 to allow easier loading into 3D visualization software, as well as notice that the maximum frequency depth value (vertical blue line) needs to be shifted to the left to z=0, according to aspects of the invention.

Referring to FIG. 12, it is common for spikes to appear in the raw data where recorded depth values are unrealistic. This is because confocal measurements are based on the intensity of reflected light. The acquisition software may introduce numerical spikes into the saved data when light intensity is very low (or high). In particular, FIG. 12 shows a histogram of depth distribution used to determine the cutoffs for noise, notice that depth values have been multiplied by 1,000 to allow easier loading into 3D visualization software, as well as notice that the maximum frequency depth value (vertical blue line) needs to be shifted to the left to z=0. (1) Remove spikes using a spatial filter. Spikes can sometimes be recognized in the depth distribution histogram where the depth values are larger than a maximum cutoff value or less than a minimum cutoff value (FIG. 12); (2) Replace spikes with null values; and (3) Shift depth values by a constant to make the maximum frequency occur at a depth of z=0;

Part [4] Load and Edit Slab Surface in 3D Visualization Software

Figure 13:
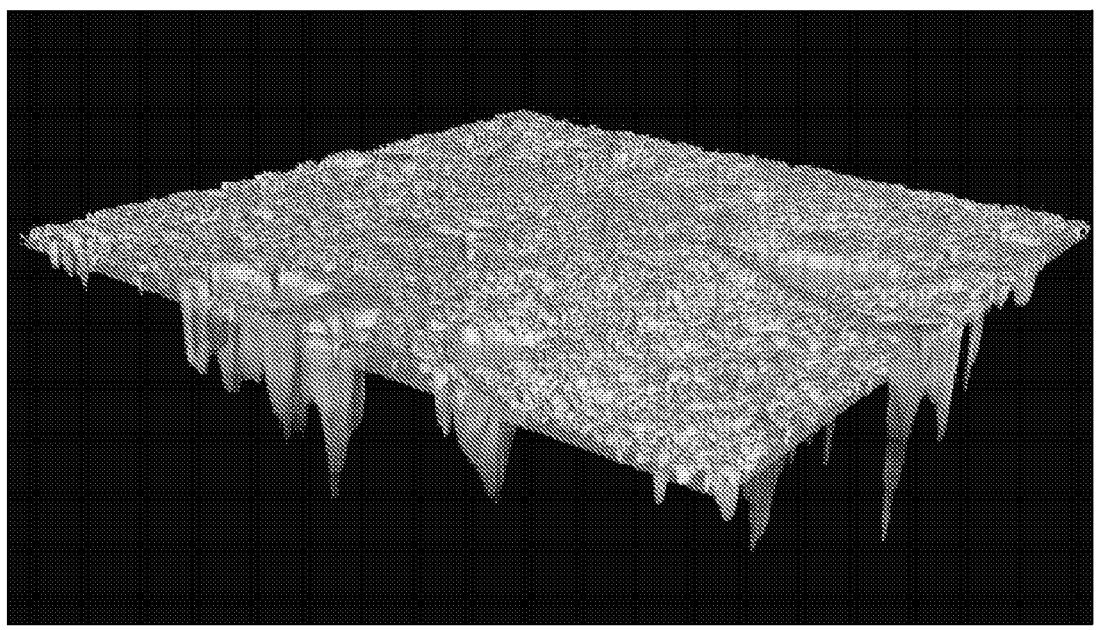
FIG. 13 shows horizons bounding pore spaces, such that the area is 2×2 cm, vertical exaggeration is 5× and the 50-μ truncation plane is shown as a horizontal surface just below the rock surface, along with the Z-values above the truncation plane can be eliminated to remove surface noise, according to aspects of the invention.

Referring to FIGS. 12 and 13, (1) Depending on the 3D visualization software used, it may be necessary to multiply x-y-z values by a constant, for example, 1000, to facilitate loading; (2) Import the gridded z-values into 3D visualization software; (3) Create the surface using appropriate algorithms (FIG. 13). In particular, FIG. 13 shows horizons bounding pore spaces, such that the area is 2×2 cm, vertical exaggeration is 5× and the 50-μ truncation plane is shown as a horizontal surface just below the rock surface, along with the Z-values above the truncation plane can be eliminated to remove surface noise; and (4) Use nearby values to fill in the null values created by spike removal.

Part [5] Create the Truncation Plane

Still referring to FIG. 13, (1) Create a horizontal truncation plane to remove surface noise, if necessary (FIG. 13); and (2) truncation plane of 50μ is normally sufficient to remove noise from smooth, but unpolished rock surfaces.

Part [6] Build the Model Grid and Compute Discrete Pore Volumes and Areas

Figure 14:
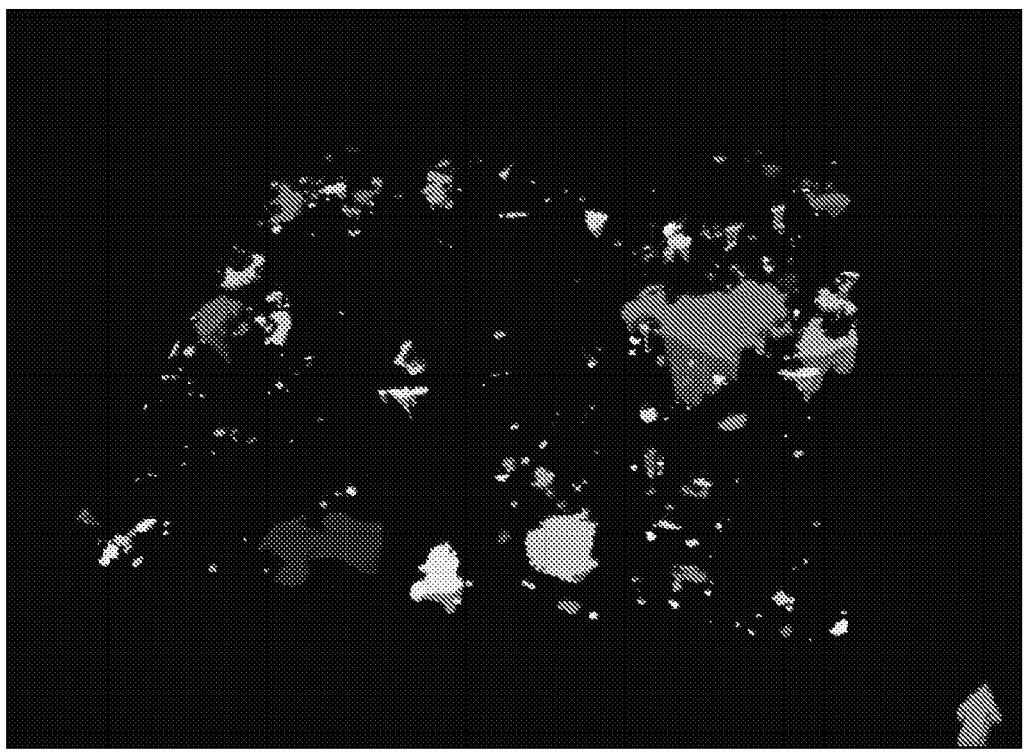
FIG. 14 shows each color represents connected volumes (voxels) that belong to discrete pores, and the area is 2×2 cm area, vertical exaggeration is 5×, according to aspects of the invention.

Referring to FIG. 14, FIG. 14 shows each color represents connected volumes (voxels) that belong to discrete pores, and the area is 2×2 cm area, vertical exaggeration is 5×. (1) Build a 3D model grid between the truncation plane and the z-value of the deepest pore; (2) Use "connected volume" utilities to distinguish all discrete pores (known as geobodies) that are composed of touching voxels (FIG. 14); and (3) Use volume and surface area utilities to compute 2D pore areas, 3D pore volumes, and 3D pore surface areas for each discrete pore.

Laser Confocal Profilometry

Laser confocal profilometry follows basically the same procedure as white-light confocal profilometry (Parts [1] through [6] in the previous discussion). The sample is either a polished thin section or a polished rock surface. The thin section can be impregnated with epoxy or unimpregnated. If a thin section is used, one can avoid many problems such as tilted surfaces and surface noise. Numerical spikes may still occur.

EXAMPLES

White-Light Confocal Profilometry

Figure 15:
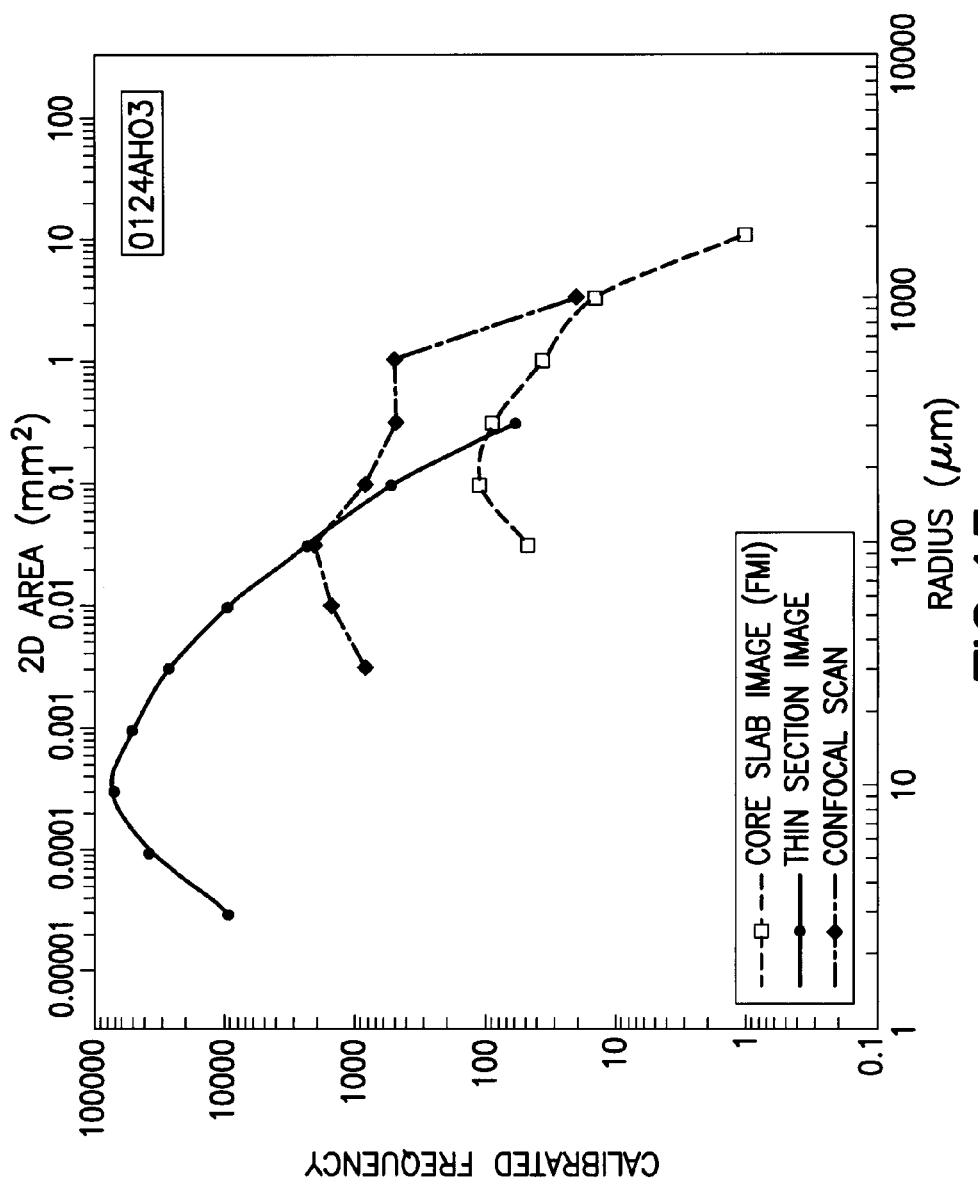
FIG. 15 shows a calibrated pore-body frequency distribution for limestone sample: the truncation depth Z=105μ is used for confocal data; the confocal pores were filtered for radius greater than 30μ; and the radius (r) was calculated from area (A) using $A=\pi r^2$, i.e., area-equivalent radius, according to aspects of the invention.

FIG. 15 addresses cumulative frequency plots, wherein the cumulative frequency plots of pore-size distribution generated from white-light confocal profilometry can be compared to distributions determined using other, more conventional techniques (FIG. 15). In particular, FIG. 15 shows a calibrated pore-body frequency distribution for limestone sample. Truncation depth Z=105μ is used for confocal data. The confocal pores were filtered for radius greater than 30μ. The radius (r) was calculated from area (A) using $A=7\pi r^2$, i.e., area-equivalent radius. The core-slab and thin-section image data were taken from Tanprasat (2005) (see Tanprasat, S. J., 2005, Petrophysical analysis of vuggy porosity in the Shu Aiba formation of the United Arab Emirates: MSc thesis, Colorado School of Mines, Golden, Colo., 190 p). Note that the frequency of confocal data starts to decrease for pores with radii close to the truncation depth. Calibrated frequency (on the y axis) means that results are computed as if the same surface area was imaged using all techniques. The calibration factor consists of a multiplication factor equal to the ratios of the imaged areas.

Still referring to FIG. 15, in order to describe the distribution of pore sizes, the Saltykov area-analysis method (Saltykov, 1967) is useful to choose grain-size intervals (see Saltykov, S. A., 1967, The determination of the size distribution of particles in an opaque material from a measurement of size distribution of their sections, in Elias, H. (ed.) Stereology: Proc. Second Int. Cong. for Stereology, New York: Springer-Verlag, p. 163). The scale factor used to determine the class interval for $A/A_{max}$ (A=area) is based on a logarithmic scale with the diameter intervals varying by a factor of $10^{-1}$ (=0.7943). Logarithmic scales with factors of $10^{-2}$ (=0.6310) and $10^{-3}$ (=0.5012) for areas and volumes are used. The cumulative frequency is the total number of pores greater than a certain size, for example, normalized diameter ($D/D_{max}$; D=diameter) or normalized 3D volume ($V_{3D}/V_{3Dmax}$; V=volume).

Figure 16:
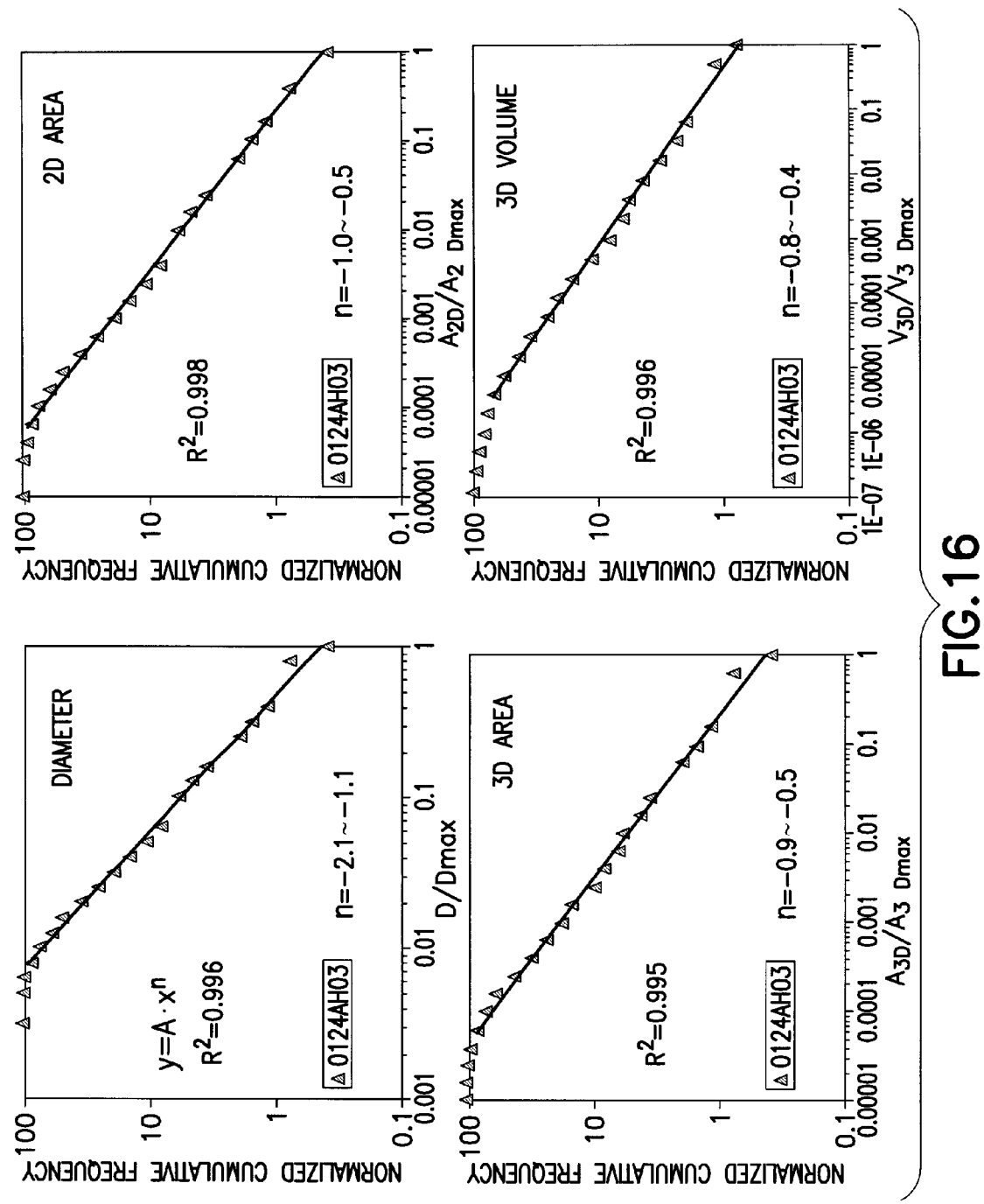
FIG. 16 shows a normalized cumulative frequency vs. normalized diameter: showing the normalized 2D area, normalized 3D area, and normalized 3D volume; wherein the normalization of diameter, area, and volume is done by taking the ratio between each measurement and the maximum ($D_{max}$, $A_{max}$, $V_{max}$) measurement observed; and the cumulative frequency (on the y axis) is normalized so the highest value is 100, according to aspects of the invention.

Referring to FIGS. 15 and 16, in the rocks we have studied, pore-size distributions tend to follow a power-law equation (FIGS. 15 and 16). In particular, FIG. 16 shows a normalized cumulative frequency vs. normalized diameter: showing the normalized 2D area, normalized 3D area, and normalized 3D volume; wherein the normalization of diameter, area, and volume is done by taking the ratio between each measurement and the maximum ($D_{max}$, $A_{max}$, $V_{max}$) measurement observed; and the cumulative frequency (on the y axis) is normalized so the highest value is 100. In a pore system with a power-law pore-size distribution, the number of pores (N) of size≧D is:

$$N_{\geq D} = A \times \left(\frac{D}{D_{max}}\right)^n$$

where the power n varies for different properties and different samples. $D_{max}$ is the maximum diameter observed. There is an edge effect due to the loss of resolution for small pores, which is shown in the plot as the tapering trend toward small pores (FIGS. 15 and 16). This power-law distribution behavior of pore sizes is also observed for fracture size distribution (see Marrett, R., Ortega, O. J., and Kelsey, C. M., 1999, Extent of power-law scaling for natural fractures in rocks: Geology, v. 27, p. 799-802).

Figure 17:
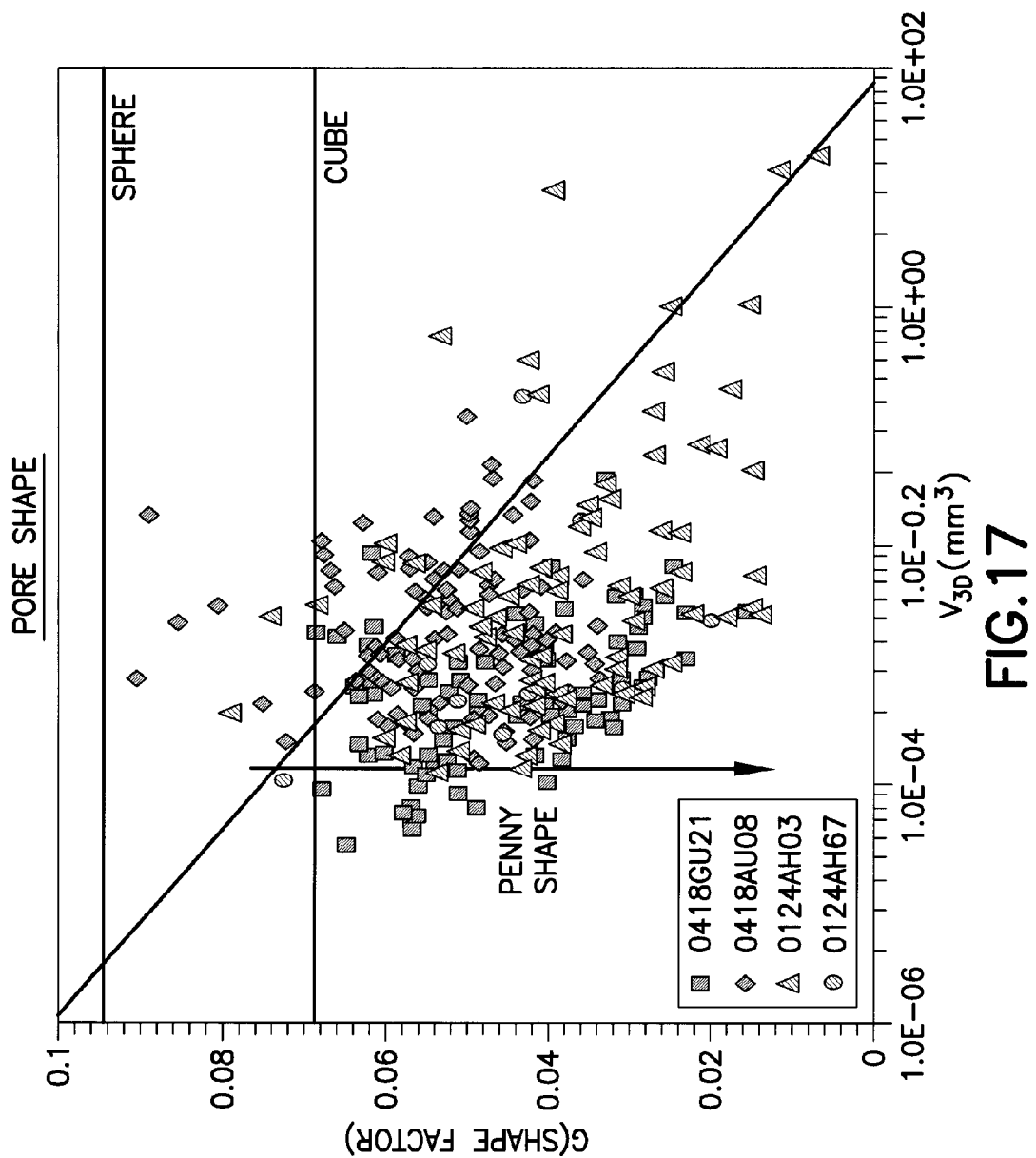
FIG. 17 shows a correlation between 3D pore shape factors, G, and pore volumes, $V_{3D}$, for 4 samples, along with the 2 samples with black symbols being dolomites, and the 2 samples with blue symbols being limestones, according to aspects of the invention.
Figure 19A:
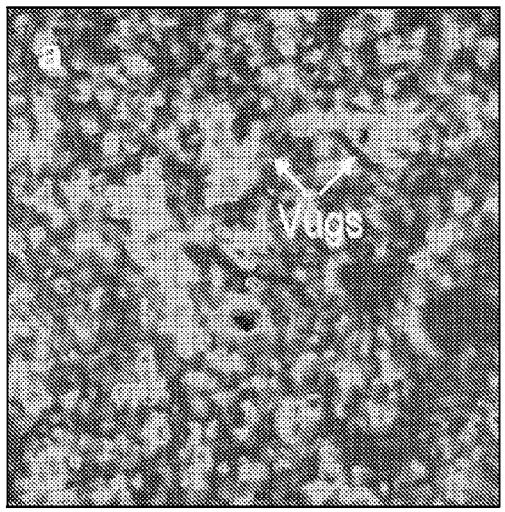
FIG. 19a-19d, FIG. 19a shows the real surface and in FIGS. 19b, 19c and 19d shows three realizations using multipoint statistics (MPS), FILTERSIM) simulations, wherein the colors represent depth in microns: red is the rock surface, yellows, blues, and greens are vugs, such that the area is 2×2 cm for the original scan and for each realization, according to aspects of the invention.
Figure 19B:
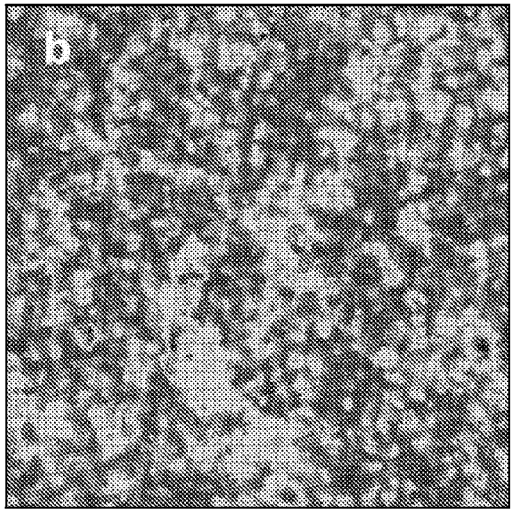
Figure 19C:
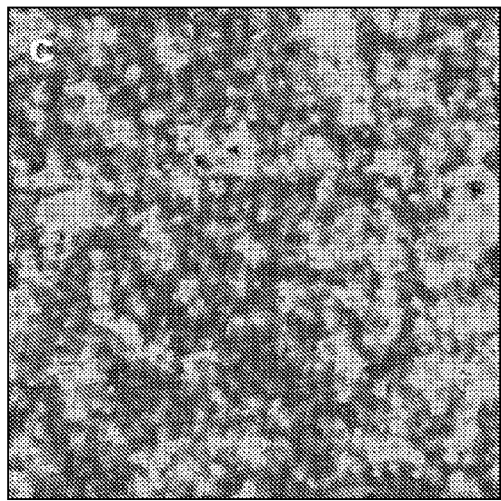
Figure 19D:
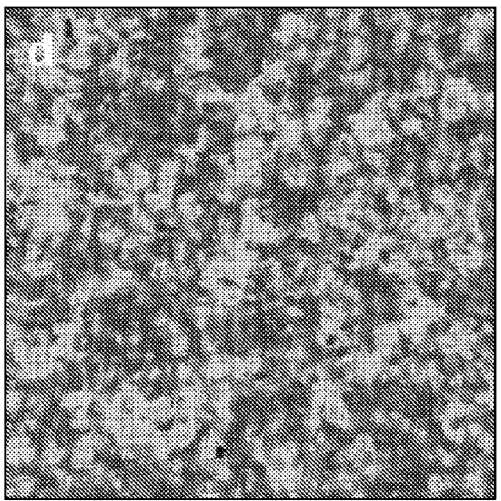

FIG. 17 relates to the 3D pore shape factor. Because we have detailed information about 2D surface area, 3D surface area, and 3D volume for each individual pore, we can study the 3D pore geometry, which includes the 3D pore shape factor and the total 3D surface area. The 3D pore shape factor may vary with pore size. In particular, FIG. 17 shows a correlation between 3D pore shape factors, G, and pore volumes, $V_{3D}$, for 4 samples, along with the 2 samples with black symbols being dolomites, and the 2 samples with blue symbols being limestones. To calculate the dimensionless pore shape factor, we use the equation:

$$G_{3D} = V/S^{1.5}$$

where V is the volume and S is the 3D surface area of a pore (see Prodanović, M., Lindquist, W. B., and Seright, R. S., 2006, Porous structure and fluid partitioning in polyethylene cores from 3D X-ray microtomographic imaging: Journal of Colloid and Interface Science, v. 298, p. 282-297). FIG. 17 shows the correlation between $G_{3D}$ and pore volume. The trend of the correlation shows that the pore shape factor decreases as the pore volume increases. This indicates that larger pores have rougher surfaces and thus larger surface areas.

Referring to the comparison with NMR and MICP data. Nuclear magnetic resonance (NMR) data yield $T_2$ distributions, which are related to pore-body size distributions. Mercury injection capillary pressure (MICP) provides pore-throat size distributions. In order to compare $T_2$ distributions with the MICP data, the relationship:

$$T_2 = 1000 r/\rho_e$$

is used, where r is the pore-throat size in microns from MICP, and $\rho_e$ is the effective relaxivity, in μ/s.

It is noted that confocal profilometry also provides pore-body size distributions for pores above a certain size threshold, and this can be related to $T_2$ distributions using the equation:

$$T_2 = (V/S)/\rho$$

where $\rho$ is the surface relaxivity in $\mu/s$, V is the volume and S is the 3D surface area of a pore. It is possible to derive the 3D pore volume and 3D pore surface area from confocal profilometry, and independently calculate the volume-to-surface ratio (V/S) for each individual pore. We use the term "shift factor" instead of "surface relaxivity" in order to relate the $T_2$ distribution to the volume-to-surface ratio derived from confocal profilometry.

Referring to FIG. 18, it was recorded from experimental results that the distribution curve of volume-to-surface ratio is very similar to the $T_2$ distribution curve (FIG. 18). The values of shift factors vary between 17 and 500 $\mu/s$ for different samples. However, there is no obvious physical meaning for the shift factor yet.

Still referring to FIG. 18, the comparison of the $T_2$ distribution and volume-to-surface ratio from confocal profilometry is useful because they both measure pore-body sizes. It is noted that FIG. 18 shows a comparison of pore-size distributions from NMR, MICP, and confocal profilometry, along with all data that are shifted to overlie the T2 distribution. Our current result is promising because when we compare NMR with MICP data, an assumption is made concerning the ratio between pore-body and pore-throat sizes. However, when we compare results from confocal profilometry to NMR data, no comparable assumption is made.

FIG. 19 refers to 3D digital rock models. For example, multi-point statistics (MPS) can be used to capture the characteristics of pore-size distribution from confocal profilometry. We used the continuous variable modeling capabilities of Filtersim (Zhang, 2006) to generate realizations of confocal scans. FIG. 19 shows the comparison between a confocal scan of a rock and 3 MPS realizations. Characteristics of the confocal scan are matched in the realizations, i.e., the depth distribution histogram, the pore-size distribution, and the pore geometry.

Figure 20:
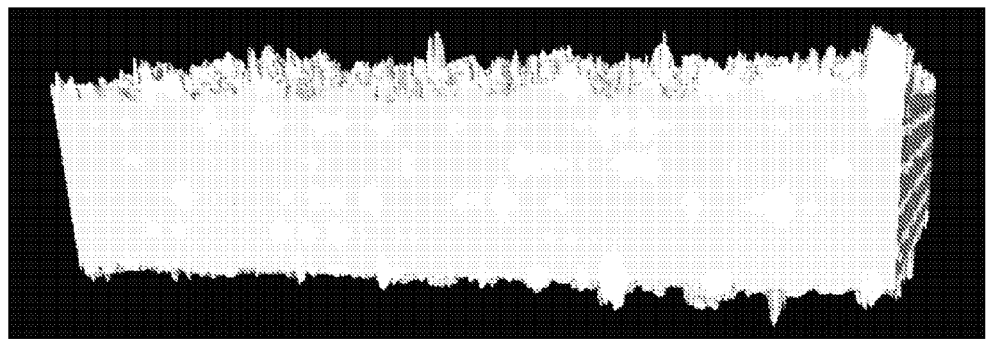
FIG. 20 shows a 3D grid in Petrel showing 6 stacked realizations from MPS modeling, wherein the white areas are pores and yellow areas are the rock matrix, along with no vertical exaggeration, according to aspects of the invention.
Figure 21:
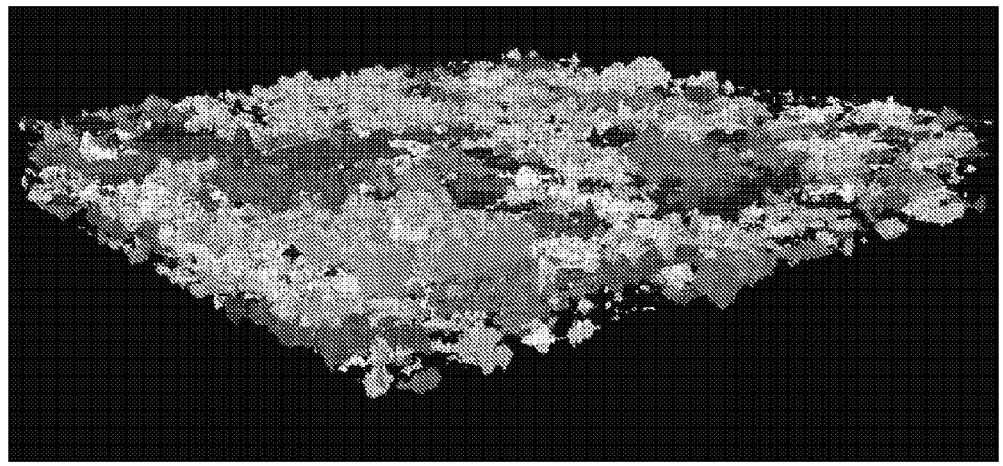
FIG. 21 shows a connected volumes for discrete pores modeled using MPS, wherein each discrete pore is a different color, according to aspects of the invention.

Referring to FIGS. 19-20, it is possible to build 3D digital rock models from multiple MPS realizations of confocal scans. The procedure is to follow the steps (Parts [1] through [6] in the previous discussion), to make surfaces and grids. Generate multiple realizations of confocal scans using MPS (as shown in FIG. 19). For each realization, generate the mirror image, and juxtapose this with the original realization. Stack the MPS realizations, plus their mirror images, with a spacing that equals the deepest pore modeled in each realization. The result is a stacked series of pores that statistically match the original confocal scan (FIGS. 20 and 21). In particular FIG. 20 shows a 3D grid in Petrel showing 6 stacked realizations from MPS modeling, wherein the white areas are pores and yellow areas are the rock matrix, along with no vertical exaggeration. FIG. 21 shows connected volumes for discrete pores modeled using MPS, wherein each discrete pore is a different color. The volume between the pores is considered to be the rock matrix.

EXAMPLES

Laser Confocal Profilometry

Figure 22:
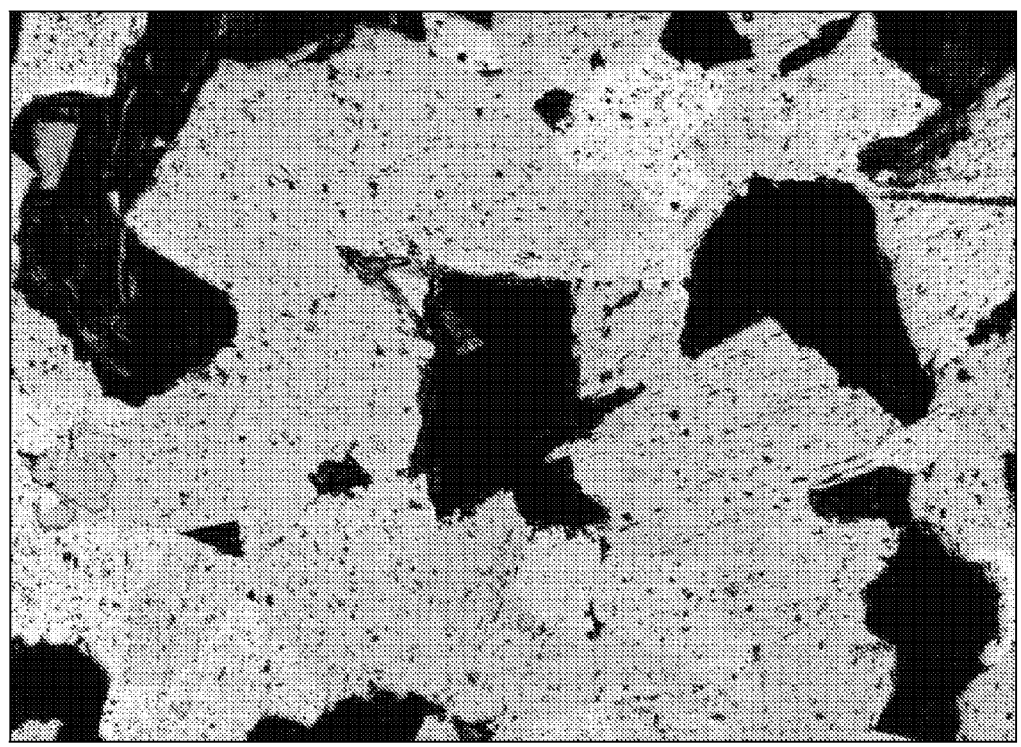
FIG. 22 shows a dolomite imaged using confocal reflected laser microscopy, wherein the black is open porosity, gray is the dolomite mineral and having an objective 20×, scanned area 616×462μ, according to aspects of the invention.
Figure 23:
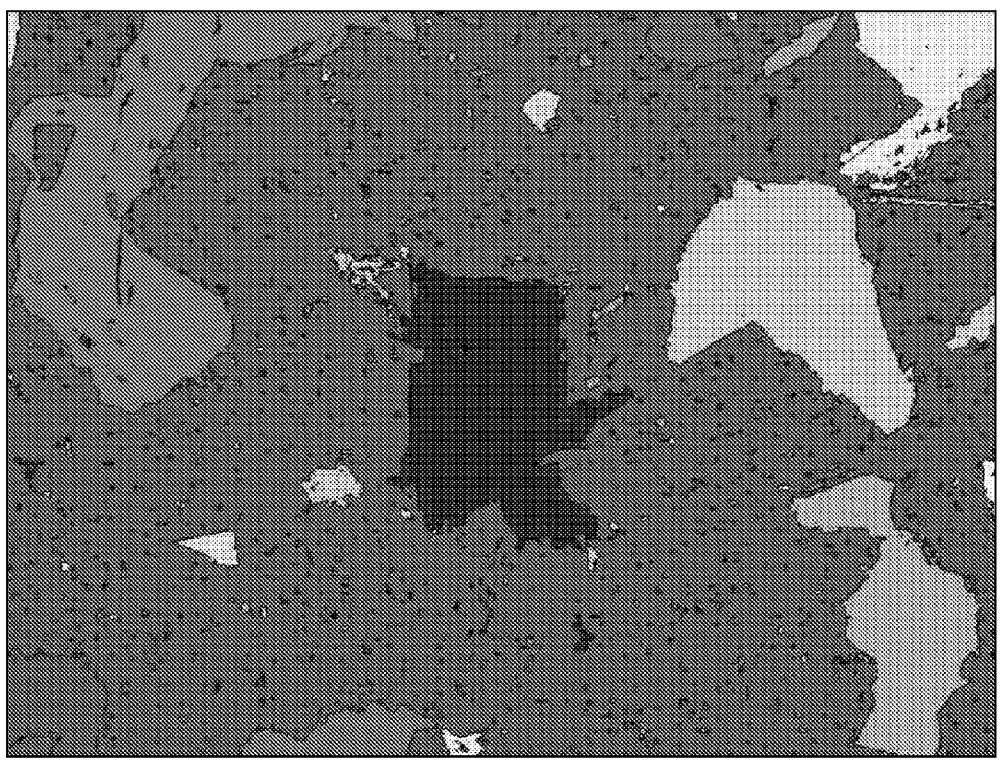
FIG. 23 shows pore bodies (total 1921) for entire image from confocal reflected laser profilometry, wherein the Objective is 20× and the area is 616×462μ, according to aspects of the invention.
Figure 24:
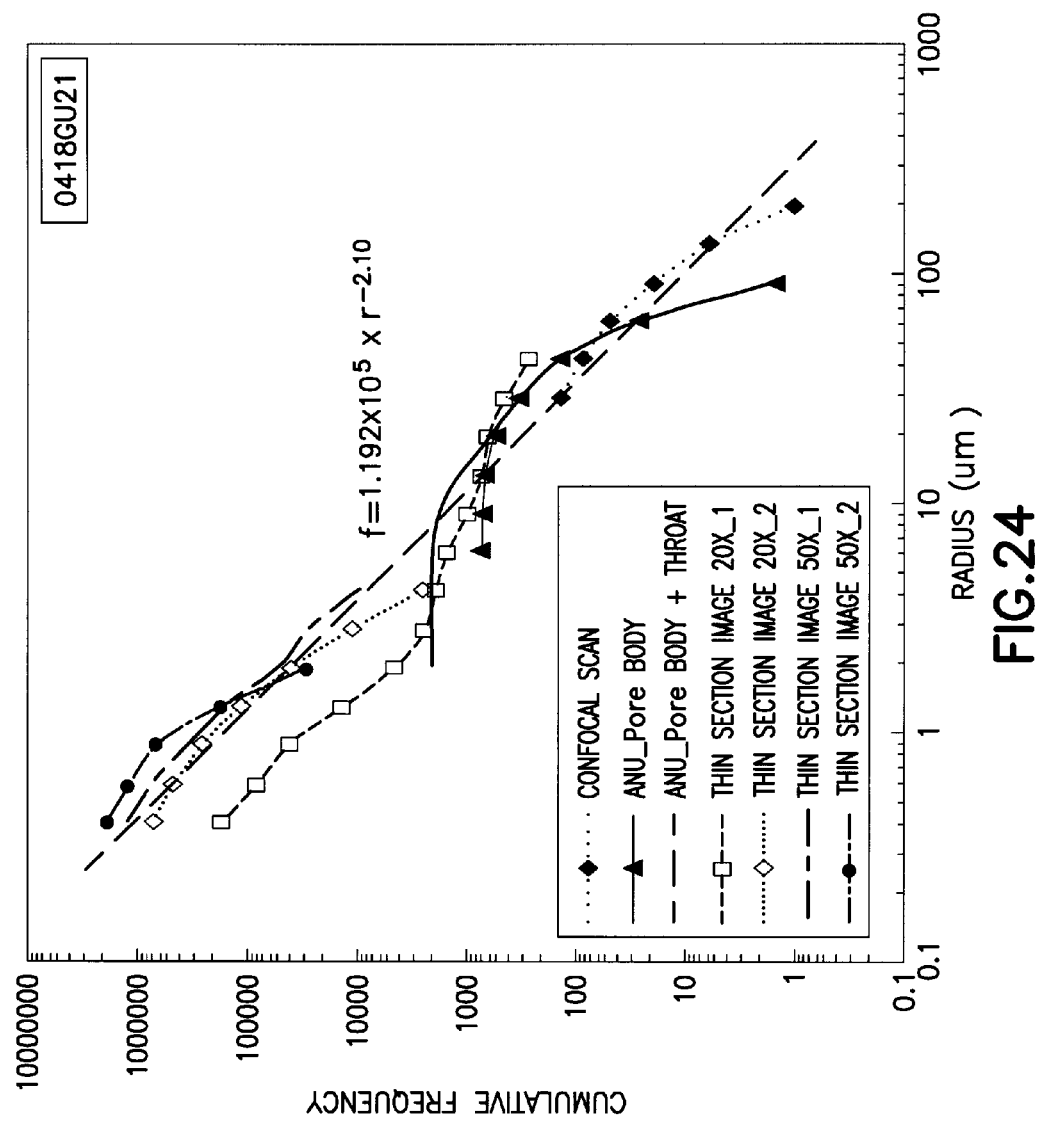
FIG. 24 shows a cumulative pore-body frequency distribution for dolomite sample shown in FIGS. 22 and 23: wherein the results are from microCT scans ("ANU"), white-light confocal profilometry ("Confocal Scan"), and laser confocal profilometry ("Thin Section Image") using various objective lenses and scan areas; all results are normalized to the same bulk volume, such that the blue dashed line is a best-fit line; and the power law best-fit equation is also shown, according to aspects of the invention.

Referring to FIGS. 22-24, it is noted FIGS. 22 and 23 show scanned views of a polished rock surface, with mineral grains and open pores. It is noted FIG. 22 shows a dolomite imaged using confocal reflected laser microscopy, wherein the black is open porosity, gray is the dolomite mineral and having an objective 20×, scanned area 616×462µ. FIG. 23 shows a pore bodies (total 1921) for entire image from confocal reflected laser profilometry, wherein the Objective is 20× and the area is 616×462µ. The laser confocal scan is saved as a .txt file and loaded into 3D visualization software following Parts [1] through [6] in the previous discussion. FIG. 24 is a cumulative frequency plot of 3D pore-size distribution that compares results for the same rock sample analyzed using laser confocal profilometry, white-light confocal profilometry, and microCTscans. In particular, FIG. 24 shows a cumulative pore-body frequency distribution for dolomite sample shown in FIGS. 22 and 23: wherein the results are from microCTscans ("ANU"), white-light confocal profilometry ("Confocal Scan"), and laser confocal profilometry ("Thin Section Image") using various objective lenses and scan areas; all results are normalized to the same bulk volume, such that the blue dashed line is a best-fit line; and the power law best-fit equation is also shown.

Limitations of White-Light and Laser Confocal Profilometry

White-light confocal profilometry is useful for pores in the size range from centimeters to no less than 10µ. Laser confocal profilometry is useful for pores in the range of 0.1 to 100's of microns. Obviously, the technique should be chosen based upon the expected pore-body size distributions.

Figure 25:
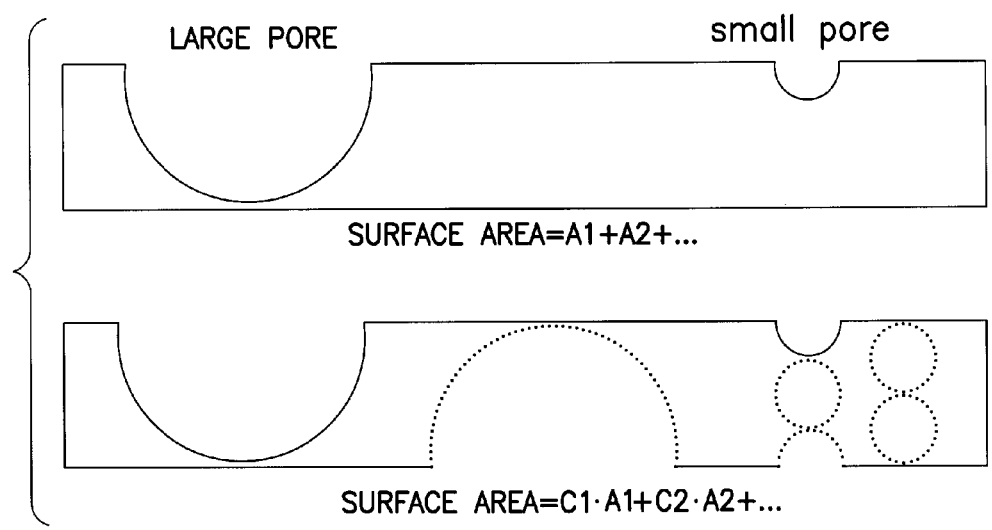
FIG. 25 shows a schematic view of large and small pores (top) that can be imaged using confocal profilometry: the bottom view shows additional large and small pores that could occupy the same bulk volume, but are not imaged using confocal profilometry because they do not intersect the slab surface; the confocal profilometry is considered to be a 2.5D technique; such that a 2D technique would not measure the depth of the pores; and a 3D technique would see all of the pores in the bottom view, according to aspects of the invention.

Referring to FIG. 25, confocal profilometry is more than a 2D technique because there is a depth dimension to the imaged pores. Confocal profilometry is not a 3D technique, because the scanner does not see below the exposed surface of the rock. Transmitted confocal laser microscopy is needed for that. Any pore that is not cut by the slab surface is not imaged (FIG. 25). In particular, FIG. 25 shows a schematic view of large and small pores (top) that can be imaged using confocal profilometry: the bottom view shows additional large and small pores that could occupy the same bulk volume, but are not imaged using confocal profilometry because they do not intersect the slab surface; the confocal profilometry is considered to be a 2.5D technique; such that a 2D technique would not measure the depth of the pores; and a 3D technique would see all of the pores in the bottom view. An informal approach is to call confocal profilometry a 2.5D technique, because it is somewhere between 2D and 3D. MPS modeling shows promise as a way to bridge the gap between 2.5D and 3D digital rock models. Also, the fact that the pore-size distribution can be fit with a power-law equation over many orders of magnitude suggests a promising way to build 3D digital rock models using numerical approaches. Such models could be used in flow simulations, before or after being converted to pore-network models.

Still referring to FIG. 25, Soft rocks can be damaged by sawing, grinding, or polishing, and confocal scans may give erroneous results. In such cases, it is best to impregnate the rocks with epoxy, and perform confocal scans on pore casts, with the rock material removed.

Figure 26:
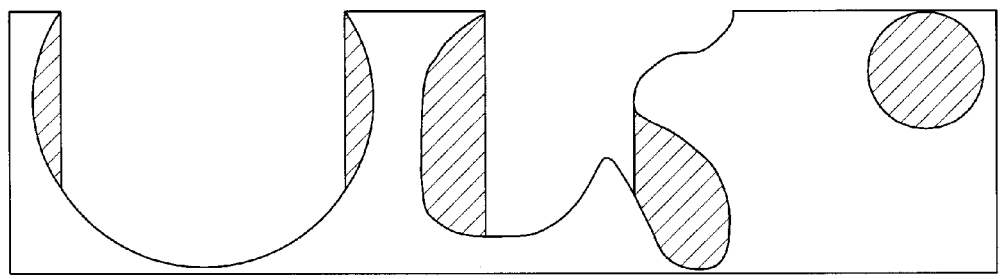
FIG. 26 shows a white area wherein the portions of pores can be analyzed by the confocal profiler; and the gray areas denote parts of pores that cannot be analyzed due to the physical limitations of confocal white-light and laser profilometry, according to aspects of the invention.

Referring to FIG. 26, a hardware limitation of confocal profilometry is that some parts of the pore area, such as hidden pores, cannot be reached by reflected white or laser light, thus cannot be analyzed (FIG. 26). In particular, FIG. 26 shows a white area wherein the portions of pores can be analyzed by the confocal profiler; and the gray areas denote parts of pores that cannot be analyzed due to the physical limitations of confocal white-light and laser profilometry. The operator must decide whether the confocal technique is suitable, based on the complexity of the shapes of the pores being analyzed.

It is noted that the present invention, by-non-limiting example, provides for a complete, integrated workflow to image, process, and generate physical pore systems in porous media, with pores as small as 0.1 μm and as large as several cm in size. Further, the invention uses (a) white-light, and (b) laser sources, whereas the cited Fredrich articles used only lasers. With white-light sources, we can image much larger pores, up to several cm in size. It is noted that the invention uses confocal profilometry, whereas the cited Fredrich articles used only transmitted confocal scanning. Further still, by-non-limiting example, the profilometry is a surface technique that does not penetrate the rock. Profilometry measures relief of pores intersected by the slab or thin section surface. Further, profilometry is neither a 2D nor a 3D technique, instead, it can be considered a 2.5D technique because it lies somewhere between 2D and 3D. Cited MPS articles by Okabe and Blunt use 2D thin section images placed at right angles to each other to generate 3D models, which is a totally different approach than the present invention. Further still, by-non-limiting example, confocal profilometry allows for the opportunity to compute pore-size distribution independently from conventional approaches, such as mercury-injection capillary pressure (MICP) and nuclear magnetic resonance (NMR). Nevertheless, confocal profilometry results are comparable to measured MICP and NMR data from the same core samples. It is also noted, by-non-limiting example, pore diameters, 3D pore surface areas, and 3D pore volumes follow a power-law distribution. Power-law equations provide a way to build analytical models of pores to fill any chosen volume. Further, pore shape factors can be computed from 3D pore surface areas and volumes, which can provide a way to know shapes and aspect ratios of real pores for dielectric, acoustic, and other pore-modeling efforts. Also, by-non-limiting example, confocal profilometry provides an independent way to determine S/V (surface area/volume) ratios for pores, an important number in NMR applications. Finally, by using MPS and confocal profilometry, it is possible to generate realistic 3D digital rock models suitable for flow simulation, either in their original form or after conversion to pore-network models.

One or more embodiments of the present invention have been described. Nevertheless, it will be understood that various modifications may be made without departing from the spirit and scope of the invention. It is noted that the foregoing examples have been provided merely for the purpose of explanation and are in no way to be construed as limiting of the present invention. While the present invention has been described with reference to an exemplary embodiment, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method for characterizing a sample of porous media using at least one measuring device and a multipoint statistical (MPS) model, the method comprising:
   a) retrieving one or more sets of reflected measured data provided by the at least one measuring device of at least one portion of a surface of the sample to produce a sample imaging log, wherein the retrieved one or more sets of measured data is communicated to a processor;
   b) using at least one noise reduction algorithm to identify noise data in the retrieved one or more sets of measured data; the identified noise data is one of removed from the retrieved one or more sets of measured data, replaced with null values or both;
   c) selecting depth-defined surface portions of the sample from the sample imaging log as a training image for inputting in the MPS model;
   d) determining pattern based simulations from the training image using at least one of a pixel-based template which is applied to the training image;
   e) constructing from the pattern based simulations one or more sampling image logs of surface portions of the sample; and
   f) repeating steps (b) to (e) through the one or more logged surface portions in order to construct three dimensional (3D) sample images from stacked successive pattern based simulations to construct at least one 3D model of the sample.

2. The method according to claim 1, further comprising step (g), using the at least one 3D model of the sample to compute one of a 3D pore surface area, a 3D pore volume, one or more 3D flow simulation models to assist in determining flow properties of the sample, the 3D flow simulation model computed after the conversion of at least one pore-network model or some combination thereof.

3. The method according to claim 1, wherein the one or more sets of reflected measured data includes data gathered from a confocal profilometry measuring device of the at least one measuring device; and wherein the confocal profilometry measuring device includes a white light.

4. The method according to claim 3, wherein the white-light confocal profilometry measuring device reflects light from the surface of the sample positioned on a movable stage, thereby producing an x-y grid of z-values or depths that measures a microtopography of the surface of the sample.

5. The method according to claim 3, wherein the retrieved one or more sets of reflected measured data is gathered from the confocal profilometry measuring device which provides for computing one of a pore-size distribution, a pore shape factor, at least one pore network model, a pore diameter or a surface area and surface volume of one or more pores on the sample.

6. The method according to claim 1, wherein the retrieved one or more sets of measured data includes data relating to the at least one portion of the surface of the sample in terms of one of a pore, a pore depth, a pore volume, a pore shape, a surface area for each discrete pore or some combination thereof.

7. The method according to claim 1, wherein the at least one noise reduction algorithm includes a spike spatial filter algorithm that identifies spike noise data, whereby the identified spike noise data is removed from the retrieved one or more sets of reflected measured data and replaced with null values to complete the training image.

8. The method according to claim 7, wherein the spike noise data is data that is recorded at depth values larger than a maximum cutoff value or less than a minimum cutoff value.

9. The method according to claim 7, wherein the null values are derived from adjacent values of each respective removed spike location, the null values completing the training image.

10. The method according to claim 1, wherein the at least one noise reduction algorithm includes a leveling algorithm with a least-squares plane-leveling algorithm.

11. The method according to claim 7, wherein the spike spatial filter algorithm is a truncation plane algorithm that identifies spike noise data, wherein the identified spike noise data is removed from the retrieved one or more sets of measured data to reduce the noise.

12. The method according to claim 1, wherein the sample imaging log includes one of unidentified sample image data, data gaps or some combination thereof.

13. The method according to claim 1, wherein the at least one measuring device is from the group consisting of one of transmitted confocal microscopy, white-light confocal profilometry, laser confocal profilometry or some combination thereof.

14. The method according to claim 1, wherein the sample is shaped as one of a uniform geometric shape, a non-uniform geometric shape or some combination thereof.

15. The method according to claim 1, wherein step (f) further comprises using each logged surface portion of the one or more logged surface portions to generate a mirror image logged surface portion, then juxtaposing the generated mirror image logged surface portion with the logged surface portion that was mirror after, wherein both logged surface portions are stacked with a spacing that equals a deepest pore modeled in each logged surface portion, resulting in a stacked series of pores that match the retrieved one or more sets of reflected measured data.

16. A method for characterizing a sample of porous media to identify flow properties of the sample whereby flow simulation models are generated from one or more sets of reflected measured data provided by at least one measuring tool in combination with a multipoint statistical (MPS) model, the method comprising:
 a) retrieving the one or more sets of reflected measured data which includes data of at least one portion of a surface of the sample to produce a sample imaging log, wherein the retrieved one or more sets of measured data is communicated to a processor;
 b) using at least one noise reduction algorithm to identify noise data in the retrieved one or more sets of measured data so that the identified noise data is one of removed from the retrieved one or more sets of measured data, replaced with null values or both;
 c) selecting depth-defined surface portions of the sample from the sample imaging log as a training image for inputting in the MPS model;
 d) determining pattern based simulations from the training image using one of a pixel-based template which is applied to the training image;
 e) constructing from the pattern based simulations one or more sampling image logs of surface portions of the sample; and
 f) repeating steps (b) to (e) through the one or more logged surface portions in order to construct three dimensional (3D) sample images from stacked successive pattern based simulations which provides for constructing at least one 3D model of the sample,
 wherein the at least one 3D model of the sample provides for further constructing one or more flow simulation models to assist in determining flow properties of the sample.

17. The method according to claim 16, wherein the sample imaging log includes processed raw data that consists of measured values and non-measured values.

18. The method according to claim 17, wherein the processed raw data includes processing the raw data by one of data leveling of the sample, data filtering for identifying noise so the noise data is removed, data filtering to identify spike data so the spike data is removed and replaced with the null values, multiplying shift depth values or x-y-z values by a constant to make a maximum frequency occur at a depth of z=0, subtracting values from a horizontal truncation plane or some combination thereof, wherein the processed raw data is loaded into the MPS model to assist in determining flow properties of the sample.

19. The method according to claim 16, wherein the constructed sample image logs of surface portions of the sample includes plotting a digital file of the constructed sample images onto one of a digital media or hard copy media.

20. The method according to claim 16, wherein the sample is from a geological formation and shaped as one of a rectangle shape, a cylindrical shape, a shape having at least one planar surface or some combination thereof.

21. The method according to claim 16, wherein a set of depth-defined data from the retrieved one or more sets of measured data in combination with the MPS model provides for computing a surface training image of the at least one portion of the sample, wherein the spike noise data is identified and replaced with null values to generate a complete surface training image.

* * * * *